US009009313B2

(12) United States Patent
Rice et al.

(10) Patent No.: US 9,009,313 B2
(45) Date of Patent: *Apr. 14, 2015

(54) SIMULTANEOUS MAINTENANCE OF MULTIPLE VERSIONS OF A WEB-BASED BUSINESS INFORMATION SYSTEM

(71) Applicant: Netsuite Inc., San Mateo, CA (US)

(72) Inventors: Theodore R. Rice, Boulder, CO (US); Steven Ellis Rolls, Sunnyvale, CA (US); Christian Marenbach, San Mateo, CA (US)

(73) Assignee: NetSuite Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,019

(22) Filed: Jun. 10, 2013

(65) Prior Publication Data
US 2014/0067780 A1 Mar. 6, 2014

Related U.S. Application Data

(60) Continuation-in-part of application No. 13/155,265, filed on Jun. 7, 2011, now Pat. No. 8,484,346, and a continuation of application No. 12/478,590, filed on Jun. 4, 2009, now Pat. No. 7,970,901, and a division of application No. 10/890,347, filed on Jul. 12, 2004, now Pat. No. 7,558,843.

(51) Int. Cl.
*G06F 15/173* (2006.01)
*G06F 17/30* (2006.01)
(Continued)

(52) U.S. Cl.
CPC ...... *G06F 17/30309* (2013.01); *G06Q 30/0601* (2013.01); *G06Q 99/00* (2013.01); *Y10S 707/99942* (2013.01)

(58) Field of Classification Search
CPC ........................................................ G06F 15/173
USPC ................................... 709/225, 219; 717/170
See application file for complete search history.

(56) References Cited

U.S. PATENT DOCUMENTS 5,832,496 A 11/1998 Anand et al.
5,842,193 A 11/1998 Reilly
(Continued)

FOREIGN PATENT DOCUMENTS

WO 01/09745 8/2001

OTHER PUBLICATIONS

Babcock, Charles, "Isomorphic Broadens Rich Web Client Appeal," The Foggy Mountain Report, No. 19, San Francisco, CA, published at www.charlesbabcock.com, (Jan. 8, 2003).
(Continued)

*Primary Examiner* — David Lazaro
*Assistant Examiner* — Marie Georges Henry
(74) *Attorney, Agent, or Firm* — Lane Powell PC

(57) ABSTRACT

A method, system, computer program product, and related business methods for phased rollout of an upgraded version of a web-based business information system are described. URLs associated with client requests remain the same even where the target subscriber accounts have been upgraded. Client requests for both upgraded and non-upgraded accounts are received by a common set of web servers. Client requests representing external entry points are trapped, and the receiving web server accesses a login router database to determine whether the target subscriber account is upgraded or non-upgraded, and then transfers the request to an appropriately-versioned application server. Application server sets are mapped to database sets according to system version, allowing the upgraded system database schema to be substantially different than the non-upgraded database schema. An early adopter program business method leveraging the abilities of such web-based business information system is also described. Applications to environments other than phased rollout are described, such as URL-agnostic differentiation and routing of client requests according to class-of-service of the target subscribing account.

21 Claims, 10 Drawing Sheets

(51) Int. Cl.
*G06Q 30/06* (2012.01)
*G06Q 99/00* (2006.01)

(56) References Cited

U.S. PATENT DOCUMENTS

| | | | |
|---|---|---|---|
| 5,878,230 | A | 3/1999 | Weber |
| 5,926,806 | A | 7/1999 | Marshall et al. |
| 6,025,841 | A | 2/2000 | Finkelstein et al. |
| 6,170,002 | B1 | 1/2001 | Ouchi |
| 6,208,717 | B1 | 3/2001 | Yeh et al. |
| 6,280,717 | B1* | 8/2001 | Kamakura et al. ............ 424/78.1 |
| 6,317,786 | B1 | 11/2001 | Yamane et al. |
| 6,359,976 | B1 | 3/2002 | Kalyanpur et al. |
| 6,385,641 | B1 | 5/2002 | Jiang et al. |
| 6,438,545 | B1 | 8/2002 | Beauregard et al. |
| 6,510,439 | B1* | 1/2003 | Rangarajan et al. ........... 715/229 |
| 6,591,291 | B1 | 7/2003 | Gabber et al. |
| 6,611,839 | B1 | 8/2003 | Nwabueze |
| 6,622,159 | B1 | 9/2003 | Chao et al. |
| 6,640,249 | B1 | 10/2003 | Bowman-Amuah |
| 6,641,037 | B2 | 11/2003 | Williams |
| 6,643,684 | B1 | 11/2003 | Malkin |
| 6,701,378 | B1 | 3/2004 | Gilhuly |
| 6,784,901 | B1 | 8/2004 | Harvey et al. |
| 6,785,710 | B2 | 8/2004 | Kikinis |
| 6,785,718 | B2 | 8/2004 | Hancock et al. |
| 6,839,702 | B1 | 1/2005 | Patel et al. |
| 6,856,942 | B2 | 2/2005 | Garnett et al. |
| 6,865,268 | B1 | 3/2005 | Matthews et al. |
| 6,871,214 | B2 | 3/2005 | Parsons et al. |
| 6,999,959 | B1 | 2/2006 | Lawrence et al. |
| 7,007,018 | B1 | 2/2006 | Kirkwood et al. |
| 7,032,030 | B1 | 4/2006 | Codignotto |
| 7,054,906 | B2 | 5/2006 | Levosky |
| 7,072,913 | B2* | 7/2006 | Jans et al. ............................. 1/1 |
| 7,231,427 | B1 | 6/2007 | Du |
| 7,240,280 | B2 | 7/2007 | Jolley et al. |
| 7,380,003 | B1* | 5/2008 | Guo et al. ..................... 709/226 |
| 7,412,437 | B2 | 8/2008 | Moody et al. |
| 7,461,077 | B1 | 12/2008 | Greenwood |
| 7,472,342 | B2 | 12/2008 | Haut et al. |
| 7,496,687 | B2 | 2/2009 | Griffin et al. |
| 7,685,010 | B2 | 3/2010 | Goldberg et al. |
| 7,685,515 | B2 | 3/2010 | Braud et al. |
| 7,953,800 | B2 | 5/2011 | Fabre et al. |
| 2001/0025305 | A1 | 9/2001 | Yoshiasa |
| 2001/0034771 | A1 | 10/2001 | Hutsch et al. |
| 2002/0046250 | A1 | 4/2002 | Nassiri |
| 2002/0069204 | A1 | 6/2002 | Kahn et al. |
| 2002/0120581 | A1 | 8/2002 | Schiavone |
| 2002/0120600 | A1 | 8/2002 | Schiavone |
| 2002/0120748 | A1 | 8/2002 | Schiavone et al. |
| 2002/0123957 | A1 | 9/2002 | Notarius et al. |
| 2002/0152399 | A1 | 10/2002 | Smith |
| 2002/0169797 | A1 | 11/2002 | Hegde et al. |
| 2002/0188486 | A1 | 12/2002 | Gil et al. |
| 2002/0188513 | A1 | 12/2002 | Gil et al. |
| 2002/0198800 | A1 | 12/2002 | Shamrakov |
| 2003/0001885 | A1 | 1/2003 | Lin et al. |
| 2003/0033179 | A1 | 2/2003 | Katz et al. |
| 2003/0061482 | A1 | 3/2003 | Emmerichs |
| 2003/0093443 | A1* | 5/2003 | Huxoll ........................... 707/204 |
| 2003/0093496 | A1 | 5/2003 | O'Connor et al. |
| 2003/0101065 | A1 | 5/2003 | Rohall et al. |
| 2003/0144903 | A1 | 7/2003 | Brechner et al. |
| 2003/0158975 | A1 | 8/2003 | Frank et al. |
| 2003/0163537 | A1 | 8/2003 | Rohall et al. |
| 2003/0167315 | A1 | 9/2003 | Chowdhry et al. |
| 2004/0006598 | A1 | 1/2004 | Bargali Damm et al. |
| 2004/0044703 | A1 | 3/2004 | Wildhagen et al. |
| 2004/0049571 | A1 | 3/2004 | Johnson et al. |
| 2004/0083271 | A1 | 4/2004 | Robert Tosey |
| 2004/0122943 | A1 | 6/2004 | Error et al. |
| 2004/0133810 | A1 | 7/2004 | Brischke et al. |
| 2004/0172537 | A1 | 9/2004 | Baus et al. |
| 2004/0186738 | A1 | 9/2004 | Reisman |
| 2004/0193651 | A1 | 9/2004 | McLaughlin |
| 2004/0199541 | A1 | 10/2004 | Goldberg et al. |
| 2004/0199543 | A1 | 10/2004 | Braud et al. |
| 2005/0004990 | A1 | 1/2005 | Durazo et al. |
| 2005/0012965 | A1 | 1/2005 | Bloomfield |
| 2005/0050007 | A1 | 3/2005 | Sampson |
| 2005/0055442 | A1 | 3/2005 | Reeves et al. |
| 2005/0091320 | A1 | 4/2005 | Kirsch et al. |
| 2006/0010214 | A1 | 1/2006 | McDowell et al. |
| 2007/0005762 | A1 | 1/2007 | Knox et al. |
| 2007/0043817 | A1 | 2/2007 | Oliver et al. |

OTHER PUBLICATIONS

CIO.com, "Executive Summaries: Enterprise Resource Planning," CXO Media, Inc. (Aug. 22, 2002), as printed on Mar. 27, 2003 from http://www.cio.com/summaries/enterorise/ero/index.html.

"Netledger 1 Day Test Drive Login" NetLedger, retrieved from internet from: <testdrive.netledger.com> archived Apr. 22, 2001.

Dragan, Richard V., "CRM Goes Mainstream," PC Magazine, New York, vol. 20, Iss. 11, p. 28 (Jun. 12, 2001).

Goodman, D., JavaScript Bible: Gold Edition, Hungry Minds, Inc. (2001). (cover page and table of contents only).

Isomorphic Software, "Isomorphic SmartClient (ISC) Historical/Competitive Brief," Isomorphic Software, Inc., San Francisco, CA (Jun. 12, 2003).

Isomorphic Software, "Isomorphic SmartClient (ISC) Technology Brief," Isomorphic Software, Inc., San Francisco, CA (Jun. 10, 2003).

"NetLedger Launches NetSuite, the First Online Suite That Combines ERP and CRM Functionality Aimed at Companies With Fewer Than 500 Employees," Internet retailer. Retrieved from internet <http://www.internetretailer.com/internet/marketing-conference/5666787-28-netledger-launches-netsuitetm.html> (Oct. 15, 2002).

Novotny, Jason, et al., "GridLab Portal Design," Downloaded from http://www.gridlab.org/WorkPackages/wp-4/Documents/GridSphere.pdf, 2001, pp. Cover, 1-43.

Patricia Seybold Group, "An Executive's Guide to CRM: How to Evaluate CRM Alternatives by Functionality, Architecture, & Analytics" (2002), as printed on Mar. 27, 2003 from http://www.psgroup.com/freereport/imedia/CRM-EXECGUIDE3-02.pdf.

Ray, D. and Ray, E., Mastering HTML and XHTML, Sybex, Inc. (2002) (cover page and table of contents only).

Resnick, P., Ed., "Request for Comments 2822 (RFC 2822), Internet Message Format," Internet Engineering Task Force (Apr. 2001).

Wilson, Ralph F., "A Simply Way to Format HTML E-Mail Newsletters." Jan. 1, 2000, Web Marketing Today, Issue 67.

\* cited by examiner

SIMULTANEOUS MAINTENANCE OF MULTIPLE VERSIONS OF A WEB-BASED BUSINESS INFORMATION SYSTEM

CROSS-REFERENCES TO RELATED APPLICATIONS

This application is a continuation-in-part of U.S. patent application Ser. No. 13/155,265, filed Jun. 7, 2011, entitled "SIMULTANEOUS MAINTENANCE OF MULTIPLE VERSIONS OF A WEB-BASED BUSINESS INFORMATION SYSTEM," the contents of which are hereby incorporated in their entirely by reference.

FIELD

This patent specification relates to web-based business applications. More particularly, this patent specification relates to a method, system, computer program product, and related business methods for upgrading a web-based business information system using a phased rollout approach.

BACKGROUND

The ability of business users to manage crucial business information has been greatly enhanced by the proliferation of IP-based networking together with advances in object oriented Web-based programming and browser technology. Using these advancements, systems have been developed that permit web-based access to business information systems, thereby allowing any user with a browser and an Internet or intranet connection to view, enter, or modify the required business information.

As such systems grow increasingly sophisticated, problems can arise in rolling out newer, more advanced system versions in a manner that meets the many different demands placed on the system provider. For example, it is desirable to allow advanced users to access the features and advantages of the new version of the system as soon as they are ready. At the same time, it is desirable to avoid thrusting the new version upon users of the current version who may not be ready for the new features. It is desirable to minimize the number of client-side system changes (e.g., bookmarks, macros, scripts) required by the upgrading customers to properly gain access to new version. Likewise, it is desirable to minimize any client-side system changes needed for non-upgrading customers to properly maintain access to the current version. Finally, in a web-based access environment, it is mandatory to properly manage the loading of web servers, application servers, and databases over a variety of traffic conditions to maintain full system availability for substantially all users at substantially all times.

As used herein, the term web-based business application or web-based business information system generally refers to a business software system having browser-based access such that an end user, or client, requires only a browser and an Internet/intranet connection on their desktop, laptop, network appliance, PDA, etc., to obtain substantially complete access to that system. Many web-based business information systems, including those described infra with respect to the preferred embodiments, also accommodate so-called server-to-server communications in which automated systems, rather than humans, are the requesting clients. Commonly, the web-based business information systems sends information to the automated client, and/or receives information from the automated client, using HTTP or HTTPS over TCP/IP, with the data itself being presented according to a markup language such as XML or variants thereof such as qbXML or smbXML.

Examples of web-based business applications include those described in the following commonly assigned patent applications, each of which is incorporated by reference herein: U.S. Ser. No. 10/406,915, U.S. Ser. No. 10/665,308, and U.S. Ser. No. 10/796,718 (hereinafter the "incorporated disclosures"). Further examples of web-based business applications include application service provider (ASP) hosted services provided by NetSuite, Inc. of San Mateo, Calif. such as NetSuite™, NetCRM™, NetERP™, NetSuite Small Business™, and NetCommerce™. A further example of a web-based business application is discussed in the literature referencing the web-based business application maintained by Salesforce.Com, Inc. of San Francisco, Calif.

Web-based business applications can also be implemented using non-ASP models having different hosting mechanisms, such as with self-hosted systems in which a business enterprise operates and maintains its own private, captive business information system having browser-based access across an intranet and/or the Internet. As described in the incorporated disclosures, a commercial enterprise can achieve many functional and strategic advantages by using a web-based business information system comprising integrated ERP (Enterprise Resource Planning), CRM (Customer Relationship Management), and other business capabilities.

FIG. 1 illustrates a web-based business information system environment for which one or more of the preferred embodiments described infra are particularly advantageous. It is to be appreciated that FIG. 1 is presented by way of example and not by way of limitation, in order to clearly set forth the features and advantages of the preferred embodiments described infra. Web-based business information system 102 is coupled via the Internet 104 to a plurality of customer companies 106 (Alpha Enterprises), 108 (Bob's Bikes), and 110 (Carl's Camera). Each customer company 106, 108, and 110 has a distinct account with the provider of the web-based business information system 102, as identified by a unique account identifier. The web-based business information system 102 is responsible for maintaining business data associated with each account in accordance with the services to which that account is subscribed. As used herein, the term account refers to the subscribing business entity (e.g., Alpha Enterprises, Bob's Bikes, Carl's Camera) and/or to the datasets within the web-based business information system corresponding to that subscribing business entity.

Also shown in FIG. 1 are a plurality of end users 124, 128, and 136, each end user being associated with at least one account within the web-based business information system 102. Each end user has a unique identity with respect to the web-based business information system 102 and is identified by a unique end user identifier, such as an e-mail address or social security number. As described in Ser. No. 10/406,915, supra, each end user has at least one role (e.g., Salesperson, Executive, Administrator) with respect to at least one account in the web-based business information system 102. Notably, the same end user can potentially have multiple roles across multiple customer accounts of the web-based business information system 102. However, end users can only have a single role at any particular time during any particular session with the web-based business information system 102. When accessing the web-based business information system 102 in the context of a particular role, the end users 124, 128, and 136 represent a first type of requesting client to the web-based business information system.

Also shown in FIG. 1 is an unaffiliated user 112 who generally has no particular relationship with the provider of the web-based business information system 102, but whose sessions with the web-based business information system 102 are often highly desirable. The unaffiliated user 112 can be a web shopper who is visiting a web store hosted by the web-based business information system 102 on behalf of Alpha Enterprises, for example. The web shopper may have been directed to Alpha Enterprises' hosted web store by entering a URL, by clicking a link in a targeted e-mail advertisement, by clicking a link in a search result, or by any of a variety of other methods. As another example, unaffiliated user 112 can be a potential business contact who entered a URL printed on a business card of one of the end users 124, 128, or 136. In such case, the potential business contact is directed to a page within the web-based business information system 102 where he or she can enter their contact information. Unaffiliated users represent a second type of requesting client with respect to the web-based business information system 102. Notably, end users 124, 128, or 136 may themselves be unaffiliated users with respect to some sessions with the web-based business information system 102, e.g., when they are using their browser to shop online during non-work hours or the like. For simplicity and clarity of description, in the case of end users, unaffiliated users, or other humans using a browser to access the web-based business information system 102, the term requesting client can refer to that user and/or to their browser software.

In the example of FIG. 1, Alpha Enterprises subscribes to a full slate of features offered by the web-based business information system 102, including web store hosting, payment processing, inventory control, accounting, and CRM (customer relationship management), with corresponding data being respectively stored at locations 114-122 therein. Bob's Bikes hosts its own web store 126, but subscribes to the web-based business information system 102 for payment processing, inventory control, and accounting, with corresponding data being respectively stored at locations 130-134 therein. Finally, Carl's Camera has a web store that is hosted by a third party shopping portal 138, but uses a third party payment processor 140 to process the credit card transactions associated with that web store. However, Carl's Camera subscribes to the web-based business information system 102 for the purposes of inventory control, accounting, and CRM, with corresponding data being respectively stored at locations 142-146 therein.

External business systems such as the web store 126, shopping portal 138, and the payment processing provider 140 of FIG. 1 are usually outside the control of the provider of the web-based business information system 102. However, these external business systems usually require automated communications with the web-based business information system 102 for proper updating of the data for which the web-based business information system is responsible. For example, automated communications are usually required between the payment processing provider 140 and the web-based business information system 102 to properly update the accounting data 144 for Carl's Camera after a customer payment transaction has been processed. Inventory adjustment communications between the shopping portal 138 and the web-based business information system 102 would likewise be required to properly update Carl's Camera inventory data 142 after that sale. In direct and/or standards-based cooperation with external parties in control of the external business systems, web-based business information system 102 provides a server-to-server capability for allowing such communications with the external business systems. When communicating the web-based business information system 102 in the context of such server-to-server communications, the external business systems represent a third kind of requesting client to the web-based business information system.

It is to be appreciated that FIG. 1 does not necessarily set forth all of the features of the web-based information system 102 with respect to any one client. Rather, FIG. 1 sets forth certain examples of a web-based information system for purposes of description of one or more the preferred embodiments described infra.

For purposes of clarity of description herein, a client request refers to an internet request according to a stateless internet communication protocol, such as an HTTP request. The client request includes a Uniform or Universal Resource Locator (URL) and parameters, where the term parameters is used to refer to the set of all other information accompanying the URL in the client request and/or to any particular item in the parameters. Thus, for a typical client request such as an HTTP request sent from a browser such as Microsoft Internet Explorer, the term parameters refers to the method identifier (GET, POST, etc.) and, where present, a variety of other accompanying information such as the HTTP version identifier, header(s), cookie(s), language identifiers, time stamps, the body (e.g., for POST methods), and other information as would be readily understood by one skilled in the art. Some of the parameters are often visible on the address line of most browsers (e.g., as a text string separated from the URL by a "?" character), while other parameter are not usually visible on the address line.

As used herein, the term external entry point refers to a URL that, if submitted by a requesting client to a web-based business information system in the absence of a previously established session between the requesting client and the web-based business information system, instantiates some form of login into the web-based business information system for the requesting client. For example, when an end user logs into a web-based business information system provider (e.g., "NetSuite") using a standard system login page that requests their user id and password, an HTTP request may be submitted having an external entry point URL and accompanying parameters [website URL prefix]/app/login/nlogin.ns?bob@bobsbikes.com&password=xxxx. As another example, an unaffiliated user such as a web shopper may click on an external link into the web-based business information system having an external entry point URL [website URL prefix]app/login/alphastore. As yet another example, an external business system may instantiate a server-to-server data exchange by sending an HTTP request having an external entry point URL and accompanying parameters [website URL prefix]/s/smbXML?paccount=ACCT547&data where data is a character string for the business data being communicated according to the smbXML language. The bracketed text "[website URL prefix]" in this paragraph and hereinafter represents a suitable website URL prefix.

In view of the many sophisticated features that can be offered by a web-based business information system, including accommodation of multiple user roles across multiple accounts, accommodation of different business capability combinations for different accounts, different kinds of external access into the web-based business information system using different external access points, and many other features and abilities, problems can arise in upgrading the web-based business information system to a new system version in a manner that satisfies the needs of everyone involved without, at the same time, "breaking" or overloading the system. This can be especially problematic if the upgrade process necessitates the use of a modified database schema for the new version that is not downward compatible with an existing database schema for the current version. Unfortunately, new feature sets and capabilities often implicate modification of the database schema in order to accommodate additional data.

Accordingly, it would be desirable to provide a web-based business information system that can be upgraded in a manner that allows certain accounts to upgrade to a new version as soon as they are ready, while at the same time allowing other accounts to maintain access to the current version.

It would be further desirable to provide such a web-based business information system that concurrently services client requests associated with upgraded accounts and client requests associated with non-upgraded accounts.

It would be still further desirable to provide such a web-based business information system even where the new version comprises a modified database schema that is not downward compatible with an existing database schema for the current version.

It would be even further desirable to provide such a web-based business information system that minimizes any client-side system changes needed for accommodating the upgrade process.

It would be still further desirable to provide such a web-based business information system that is highly scalable and can continue to be upgraded to newer versions in the above ways even as the number of accounts grows very large.

It would be even further desirable to provide such a web-based business information system that accommodates the ability for multiple end users to have multiple roles over one or more accounts and that accommodates multiple external access points.

It would be even further desirable to provide such a web-based business information system that requires no external entry point URL changes by requesting clients to maintain access to the web-based business information system for any particular account therein at any point during the version upgrade process.

It would be even further desirable to provide such a web-based business information system where the upgrade process has modest hardware requirements and network loading implications, such that a provider of a web-based business information system can efficiently operate in an upgrading mode for a percentage of time ranging from many months out of the year to a perpetual upgrading mode.

SUMMARY

A method, system, computer program product, and related business methods are provided in the context of a web-based business information system, wherein successive customer accounts are upgraded to a new version of the web-based business information system from an existing version over a phased rollout period. The web-based business information system is configured such that a URL associated with a particular client request can remain the same even when the corresponding account is upgraded from the current version of the web-based business information system to the new version, and wherein the web-based business information system can service client requests for both upgraded and non-upgraded accounts using a common set of web servers. The web-based business information system is configured to process the client requests using the common set of web servers even where a new database schema for the new version is substantially altered relative to a current database schema for the current version.

According to one preferred embodiment, the web-based business information system comprises a common set of web servers for receiving client requests corresponding to both upgraded and non-upgraded accounts. The web-based business information system further comprises a plurality of application servers including a first set of application servers for processing requests associated with non-upgraded accounts, and including a second set of application servers for processing requests associated with upgraded accounts. The web-based business information system further comprises a plurality of databases including a first group of databases for storing data according to said current database schema for said non-upgraded accounts, and including and a second set of databases for storing data according to said new database schema for said upgraded accounts.

Each web server is configured to determine if a URL of an incoming client request corresponds to an external entry point into the web-based business information system and, if so, to perform login routing for that client request. The login routing process comprises identifying an account corresponding to the client request and routing the client request to one of the first set or second set of application servers according to whether the identified account is a non-upgraded account or an upgraded account, respectively. The web-based business information system comprises a login router database comprising information sufficient to map the entry point URL of the client request and the accompanying parameters into a version identifier identifying whether to route the client request into one of the first or second set of application servers. Login is then performed, if necessary, by the destination application server. If the incoming client request does not correspond to an external entry point, it is forwarded to the first or second set of application servers according to a version cookie or cookie-like data item previously attached to a response during the existing client session.

According to another preferred embodiment, a method of doing business is provided in the context of a phased rollout of a version upgrade in a web-based business information system. During a phased rollout period, early adopter accounts are identified from the base of current version accounts, and early adopter end users are trained by agents of the web-based business information system provider using an offline beta system running the new version. In one preferred embodiment, the early adopters comprise advanced users who have previously requested one or more new features that are in the new version, who have posed challenging advanced questions to support personnel, and/or who have otherwise expressed interest in upgrading earlier rather than later. An early adopter account is switched over to the new version only upon certification by the agents of the web-based business information system provider that their end users are sufficiently qualified. Advantageously, because they are working on live data with real consequences, the early adopters can often identify bugs in the new version not previously identified during beta testing, which can then be corrected before subsequent accounts are switched over. Preferably, the account data for a common set of early adopters is migrated to a common current-version database, and that common set of early adopters are all switched over at the same time in by converting the common database to the new version and updating the login router database of the web-based business information system accordingly.

Advantageously, when implemented in accordance with one or more of the preferred embodiments, a smooth web-based business information system version upgrade process can be achieved that is satisfying to both novice and advanced end users, reasonably manageable for third party server-toserver access administrators, substantially invisible to unaffiliated end users, and that further has modest hardware requirements and network loading implications, such that a provider of a web-based business information system can efficiently operate in an upgrading mode for a large percentage of the time. The preferred embodiments relating to phased rollout are readily extendable to other preferred embodiments in which login routing is used to segregate incoming traffic among different groups of application servers for different criteria, such as class of service criteria, in a URL-agnostic manner.

DETAILED DESCRIPTION

Figure 1:
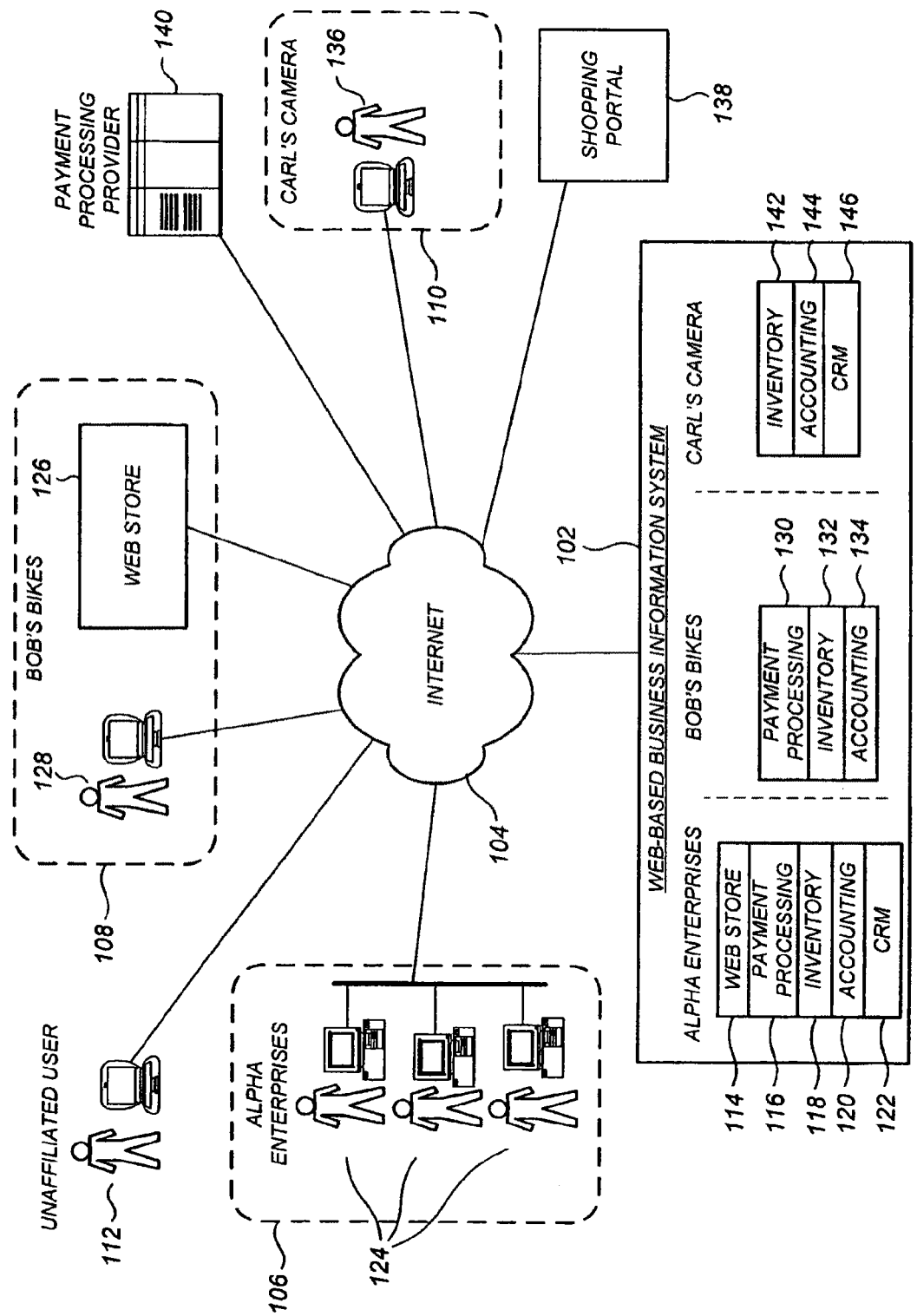
FIG. 1 illustrates a web-based business information system environment.
Figure 2:
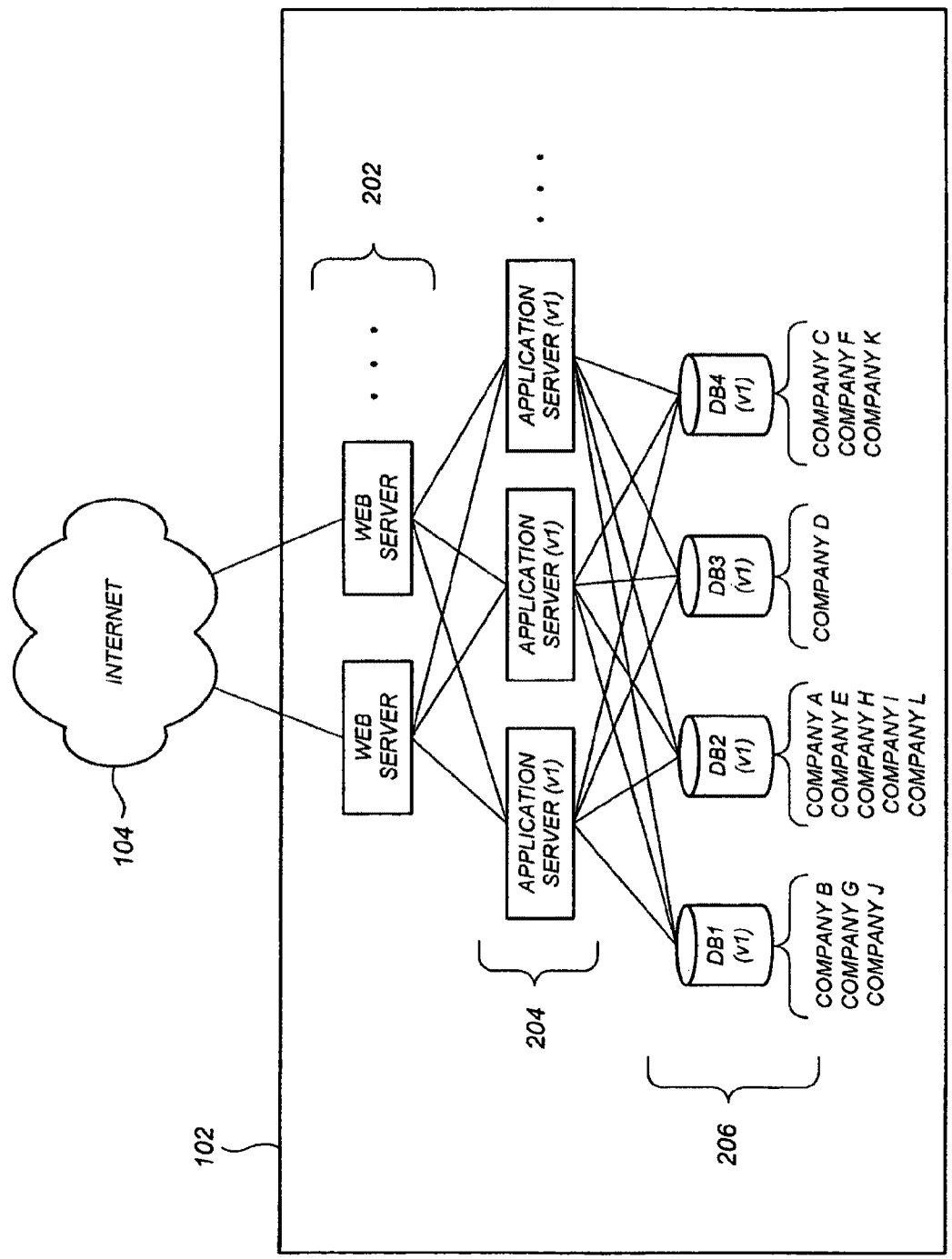
FIG. 2 illustrates a web-based business information system according to a preferred embodiment prior to modification for accommodating a phased rollout.

FIG. 2 illustrates a web-based business information system 102 according to a preferred embodiment prior to modification for accommodating a phased rollout. Web-based business information system 102 comprises a common set 202 of web servers that are substantial duplicates of each other. The web servers can run conventional web server software, such as Apache, Microsoft-HS, Netscape-Enterprise, Oracle HTTP Server, etc. on conventional operating systems such Linux, Solaris, Unix, HP-UX, FreeBSD, etc. loaded onto conventional web server hardware. Web-based business information system further comprises a plurality of application servers 204 that are also substantial duplicates of each other. Each of the application servers 204 are programmed to serve client requests according to a current version (e.g., v1) of the web-based business information system using, for example, Oracle Application Server Containers for J2EE (OC4J) or other appropriate system.

Web-based business information system further comprises a plurality of databases 206 for storing business information corresponding to subscriber accounts according to a database schema for the current version v1. Preferably, business information for any given account is contained on a single one of the databases 206, although several different accounts can be serviced by a single database, as indicated in FIG. 2.

As known in the art, one difference between the web servers 202 and the application servers 204 is that the web servers 202 are commonly associated with faster, lighter, lower-level processing tasks such as the establishment and tearing down of TCP connections, forwarding of HTTP requests to the application servers, forwarding of HTTP responses from the application servers, etc., in accordance with the overall purpose of Apache, Microsoft-IIS and the like. In contrast, the application servers 204 are commonly associated with more time-intensive tasks such as interpreting client requests, performing database queries and lookups, generating and formatting web page responses to the client requests, etc., in accordance with the overall purpose of OC4J and the like. The web-based business information system 202 represents a so-called three-tiered server architecture, comprising a first tier of web servers, a second tier of application servers, and a third tier of database servers.

It is to be appreciated that the lines in FIG. 2 between the web servers 202 and application servers 204, as well as between the application servers 204 and the databases 206, are only shown to indicate potential data communication pairings among these elements, and do not necessarily represent physical connections among these hardware elements. Rather, as known in the art, in most implementations the various hardware elements are connected via a packet-switched LAN or WAN. It is to be further appreciated that the various hardware components illustrated in FIG. 2 do not need to be located in the same room, the same building, the same city, or even the same continent, provided that they are in networked connectivity to achieve an architecture analogous to that of FIG. 2.

Web-based business information system 102, which in this example is a dedicated third party application service provider, provides services including enterprise resource planning (ERP) and customer relationship management (CRM). In a preferred embodiment similar to NetSuite™, supra, the ERP services include accounting, order processing, time and billing, inventory management, employee management and payroll, calendaring and collaboration, reporting and analysis module, and other ERP-related services. The CRM services include sales force automation (SFA), marketing automation, contact lists, call center support, web-based customer support, reporting and analysis module, and other CRM-related modules. Web-based business information system 102 further provides other business functionalities including web store, payment processing, a partner and vendor management, and integrated reporting. In other preferred embodiments, product lifecycle management (PLM) and software configuration management (SCM) services are also provided. Preferably, these functionalities are seamlessly integrated and executed by a single code base executed on one or more identically programmed application servers that access one or more databases of account data.

It is to be appreciated that the scope of the preferred embodiments is not limited to scenarios in which the web-based business information system 102 is an integration of many different business functionalities. In other preferred embodiments, the web-based business information system 102 may have a single business management functionality, e.g., it may consist only of an SFA system, or only of a vendor management system. In still other preferred embodiments, the web-based business information system 102 may comprise different combinations of these functionalities.

Figure 3:
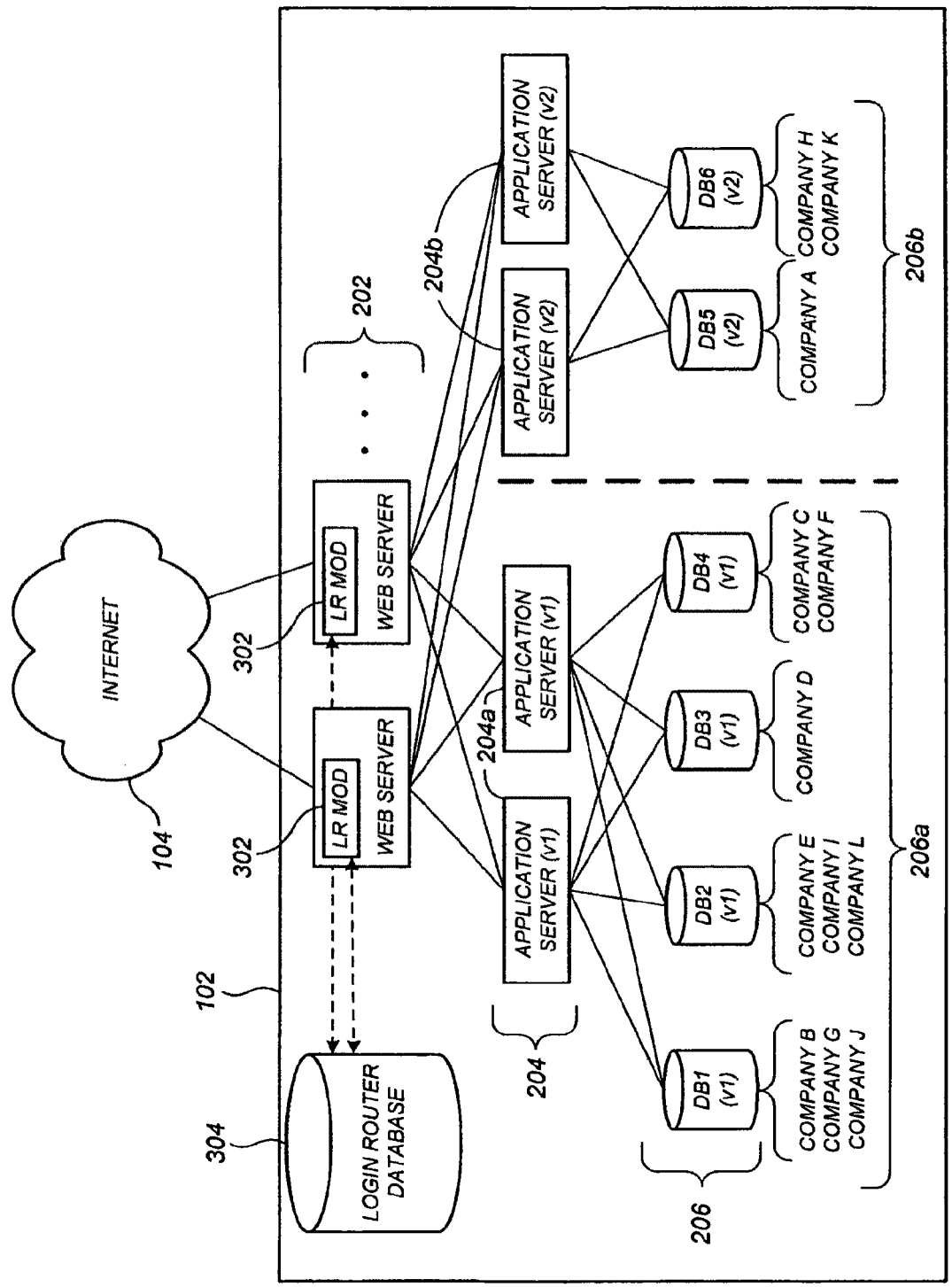
FIG. 3 illustrates a web-based business information system capable of accommodating a phased rollout process according to a preferred embodiment.

FIG. 3 illustrates the web-based business information system 102 as configured to accommodate a phased rollout process according to a preferred embodiment. Each of the common set of web servers has been modified to achieve the functionalities described herein, and includes a login router module 302. In the case of Apache web servers, the modifications including the login router module 302 can be achieved using a set of APIs provided by Apache to allow custom functionalities, resulting in a custom "mod" for the web server. Similar customization APIs are usually provided with most other web server software systems such as Microsoft-IIS.

The application servers 204 of the web-based business information system 102 are now separated into a first set 204a and a second set 204b. The application servers in the first set 204a are substantially identical to each other and remain programmed to run the current version v1 of the web-based business information system. The application servers in the second set 204b are substantially identical to each other and are programmed to run a new version v2 of the web-based business information system. Databases 206 are similarly segregated into a first group 206a storing business information according to the current version v1 database schema and a second group 206b storing business information according to the new version v2 database schema. The database groups 206a and 206b are functionally segregated from each other, and each group is accessed only by their corresponding application servers 204a and 204b. The accounts contained on databases 206b have already been upgraded to the new version, while accounts contained on databases 206a remain on the current version. A login router database 304 is provided that is accessed by the login router module 302 to determine whether to send client requests representing external entry points over to the first set 204a of application servers or to the second set 204b of application servers.

In the preferred embodiment of FIG. 3, the login router database 304 is installed on a server separate from the common set of web servers and accessed across a network. Preferably, a caching scheme is used between the web servers 202 and the login router database 302 to minimize traffic to and from the login router database server for frequently-accessed routing data. Smaller and/or less-frequently changing portions of the login router database are maintained on each web server 202, and the remaining login routing data is maintained on the login router database server 304. The scope of the preferred embodiments is not so limited, however, and in another preferred embodiment, the login router database 304 is replicated onto each of the web servers 202.

Figure 4:
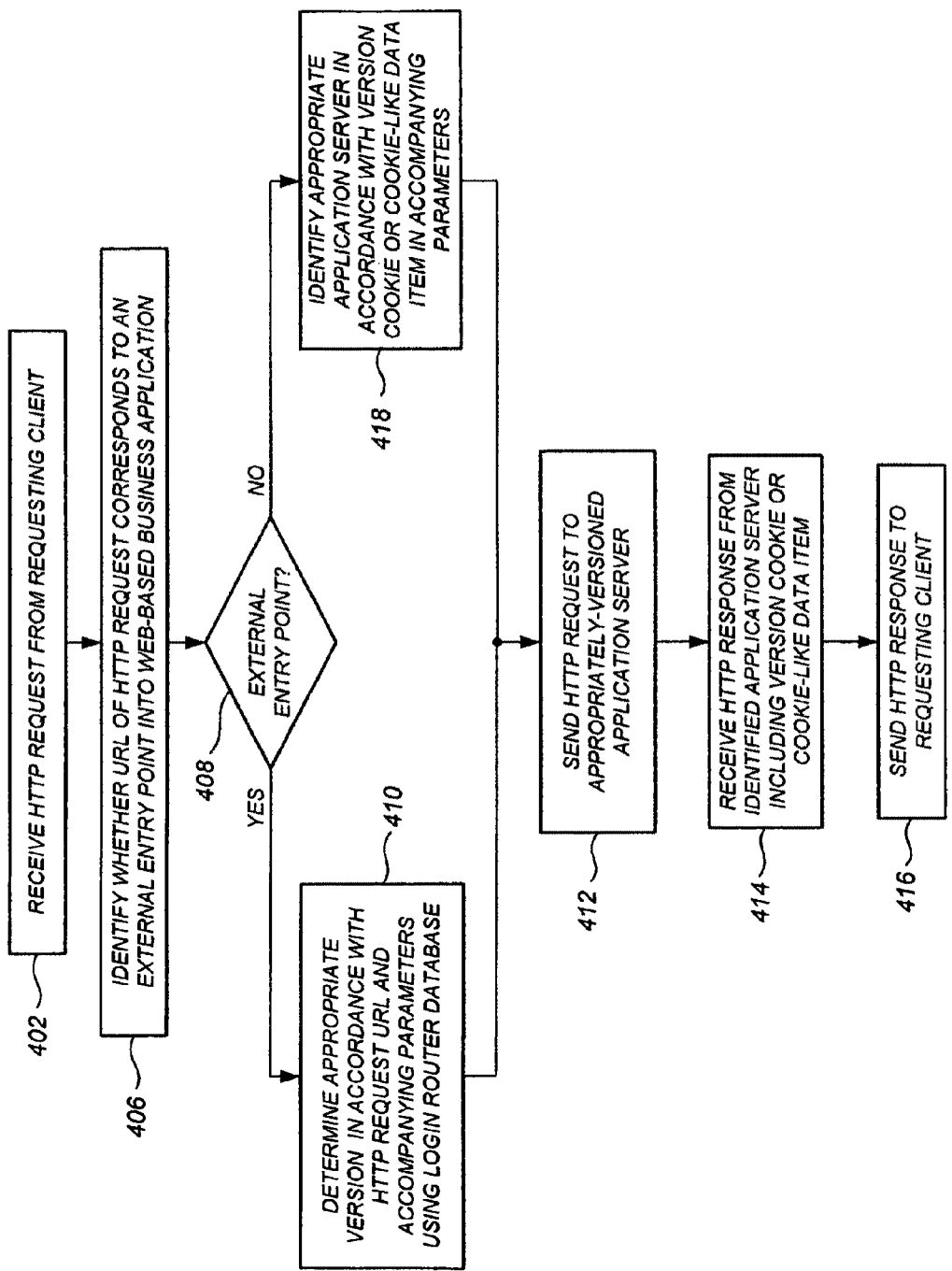
FIG. 4 illustrates a method for processing client requests according to a preferred embodiment.

FIG. 4 illustrates a method for processing client requests in a phased rollout environment according to a preferred embodiment. Client requests are delivered in the form of HTTP requests. For purposes of clarity, the web addresses specified herein are presented as "http" addresses, although it is to be appreciated that "https" addresses are to be inferred wherever the context would implicate security issues. Thus, as used herein, the term HTTP request is to be construed as referring to either standard (port 80) HTTP requests or secure (port 443) HTTPS addresses as necessary. More generally, the term HTTP request may be construed as referring to any stateless internet communication protocol (of which. HTTP is one example) riding over connection-oriented message transfer protocol (of which TCP/IP is one example)

At step 402, an HTTP request is received at one of the common set of web servers 202 from a requesting client. At step 406, it is identified whether a URL of the HTTP request corresponds to an external entry point into the web-based business information system. Stated another way, the web servers trap external entry point URLs. If an external entry point is implicated at step 408, then at step 410 an appropriate version (i.e. current vs. new) is determined in accordance with the HTTP request URL and accompanying parameters using the login router database 304.

Table 1 illustrates an example of external entry point URLs for the web-based business information system that, when hit without a previously established session, will instantiate some form of login according to any of the various capabilities of the web-based business information system. Table 1 also illustrates the relevant accompanying parameters, if any, accompanying the external entry point URLs. It is to be appreciated that Table 1 is presented by way of example only, and not by way of limitation, as there may be many other kinds of external entry points into a web-based business information system depending on the particular services and features being offered.

TABLE 1

| External Entry Point (Description) | Parameters |
|---|---|
| [website URL prefix]/app/login/nslogin.ns (standard end user login) | email, password |
| [website URL prefix]/javascript/NSTimeoutPopup.ns (session timeout popup re-login) | NKEY, email, password |
| [website URL prefix]/app/login/dashboard.ns (choose role page login) | NKEY, [security hash] |
| [website URL prefix]/app/common/custom/onlinecusrecordform.ns | ACCOUNT ID |
| [website URL prefix]/app/crm/common/onlineforms/onlinecrmform.ns | |
| [website URL prefix]/app/crm/common/nscorp/partnercobrand.ns | |
| [website URL prefix]/app/crm/marketing/campaignlistener.ns | |
| [website URL prefix]/app/crm/sales/onlineleadform.ns | |
| [website URL prefix]/app/crm/support/casecreator.ns | |
| [website URL prefix]/app/crm/support/onlinecaseform.ns | |
| [website URL prefix]/app/site/crm/externalcasepage.ns | |
| [website URL prefix]/app/site/crm/externalcaseresponsepage.ns | |
| [website URL prefix]/app/site/crm/externalcustrecordpage.ns | |
| [website URL prefix]/core/help/admin/glossarydelete.ns | |
| [website URL prefix]/core/help/admin/glossaryedit.ns | |
| [website URL prefix]/core/help/admin/taskedit.ns | |
| [website URL prefix]/core/help/helpimage.ns | |
| [website URL prefix]/core/help/helppdf.ns | |
| [website URL prefix]/core/media/media.ns | |
| [website URL prefix]/internal/admin/qbwdb/blobmedia.ns (external request handler login) | |

TABLE 1-continued

| External Entry Point (Description) | Parameters |
| --- | --- |
| [website URL prefix]/[storealias] (hosted web store login via alias) | none |
| [store domain] (hosted web store login via domain name) | none |
| [website URL prefix]/s/smbXML ("server-to-server" XML exchange) | PARTNER ID, PACCT |

At step 412, the HTTP request is then sent to an appropriately versioned application server, which then performs the login process, if needed, associated with that request. It is to be appreciated that the login routing process, i.e., the routing of the client request to an appropriately versioned application server, is not the same as, and is additional to, any login steps that would actually be performed at the application server level. For example, according to one preferred embodiment, there are no security validations performed in association with the login routing process. Instead, the login routing process represents an additional, preliminary layer that identifies whether the client request would implicate some form of login process in the absence of a previously established session between the requesting client and the web-based business information system. The determination of whether a login is actually going to be performed, and the login process itself including the various security checks (if any), are preferably performed at the application server level, and are preferably not performed at the login routing level.

Thus, for example, where a subscribing user has already logged on and submits [website URL prefix]app/login/dashboard.ns to change roles, there is no new login process performed at the application server. However, if that subscribing user entered that URL without having previously logged on, the application server would perform a full login process. In both instances, however, there is login routing performed by the web server because an external entry point URL was trapped. In a conventional manner, the application servers use state information contained in the client request to determine how to process it.

Scrupulous population of the login router database allows it to be "thin" as compared to the conventional databases consulted by the application servers in performing their normal duties, which include the actual login process when it occurs. Accordingly, the web servers 202 can still operate very quickly to handle incoming traffic loads, while also facilitating a URL-agnostic phased rollout process according to a preferred embodiment.

It is to be appreciated that, in many cases, the actual login process performed by the application server does not involve a detailed lookup of user name, password, etc. as would be associated with a login from a user of a subscribing account. For example, in the case of unaffiliated users visiting a web store hosted by the web-based business information system, the login process involves little or no security check at all, because web shoppers can be very welcome guests even if their identities are unknown. In cases such as web shoppers, the term login process simply refers to determining whether there is already an existing session with the requesting client, as determined by the presence or absence of session-maintaining information such as cookies and the like, and preparing an HTTP response as appropriate.

At step 414 the web server receives an HTTP response from the application server. A cookie or cookie-like data item containing the system version of the responding application server (e.g., "v1" or "v2" for the example of FIG. 3), termed herein a version cookie or version cookie-like data item, is contained in the HTTP response. As used herein, the term cookie-like data item refers to a component of an HTTP request or response that can be passed back and forth and altered as necessary to maintain a proper session state, or that can otherwise achieve functionalities similar to those of a cookie. In one preferred embodiment, the cookie-like data item can be a visible parameter that could be seen next to the URL on the address line of the client browser, and that is passed back and forth while being modified as necessary. It is to be appreciated that the cookie-like data item can be spread across different parts of the parameters. Furthermore, the cookie-like data item can be expressed in forms other than a "v1" or "v2" declarative, such as in the form of a distributed parameter set from which the proper version can be deduced. At step 416, the HTTP response is sent to the requesting client.

In one preferred embodiment, the version cookie or cookie-like data item is always included in the HTTP response from the application server. In another preferred embodiment, it is only included if an ongoing session is implicated, such as for a standard user login (see Table 1), and is omitted if the client request is known to be associated with a single response.

If at step 408 it is determined that an external entry point is not implicated, i.e., where an external entry point URL has not been trapped, then at step 418 the appropriate application server is identified based on the version cookie or cookie-like data item accompanying the HTTP request. If no version cookie or cookie-like data item is present and no external entry point is implicated, an error response is sent.

Figure 5:
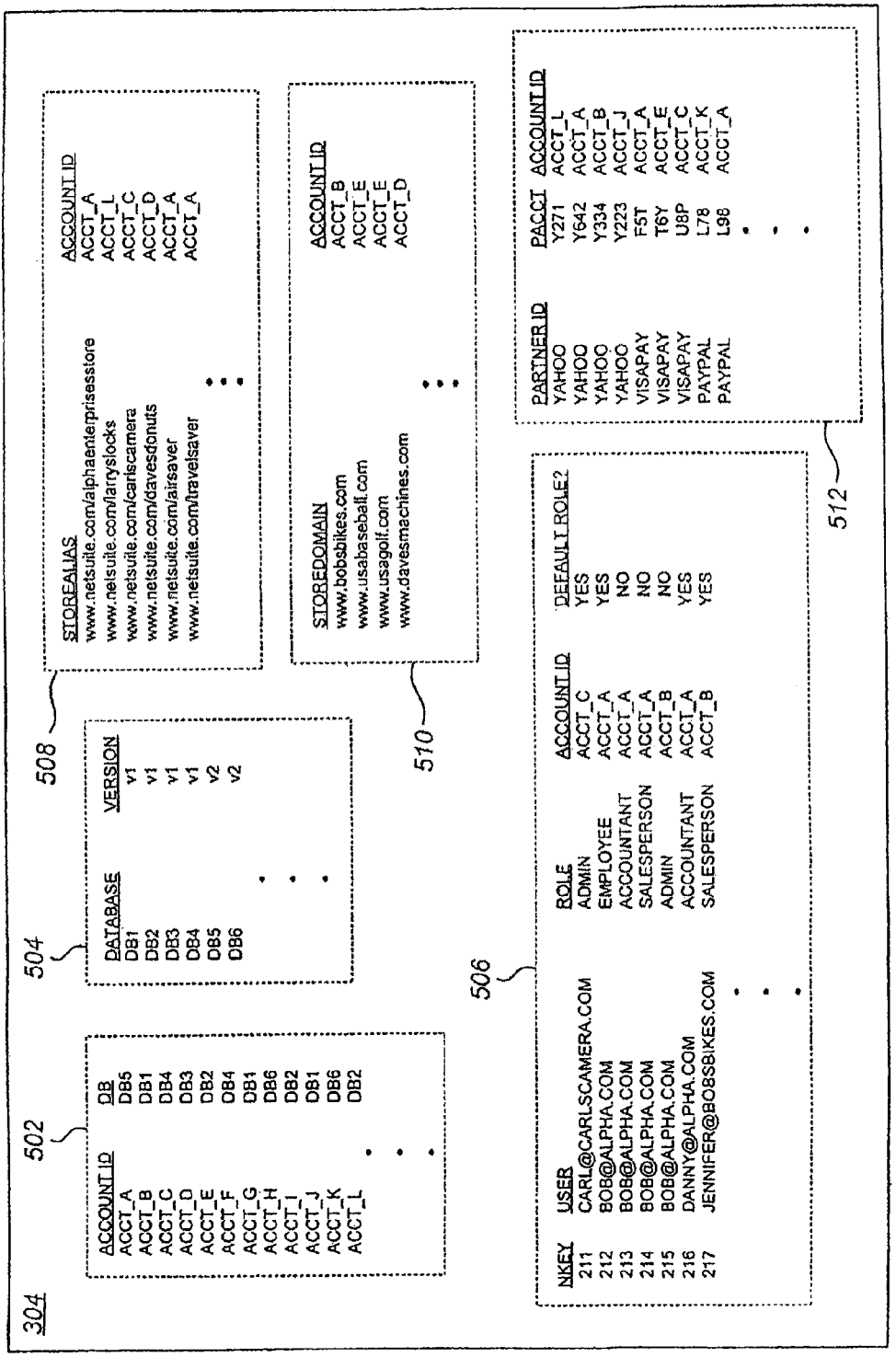
FIG. 5 illustrates a conceptual diagram of a login router database according to a preferred embodiment.

FIG. 5 illustrates a conceptual diagram of information contained in the login router database 304 according to a preferred embodiment. The login router database 304 comprises information sufficient to arrive at a determination, based on the external entry point URL and the accompanying parameters in the HTTP request, if any, of the proper version (current vs. new) of application server to which the HTTP request should be sent. Login router database comprises a first table 502 mapping account IDs into databases, a second table 504 mapping databases into version identifiers, and a third table 506 mapping specific end user IDs into account IDs based on current role. The third table 506 can also map specific end users into account IDs based on an NKEY parameter, which is used in the event that the end user was logged out of their session due to a timeout, and which thereby allows the end user to log back into the system in the same role as when they were timed out.

Login router database 304 further comprises a fourth table 508 mapping store aliases into account IDs directly, without the need for any parameters, as would be necessary for unaffiliated third party user visits to account web stores. Login router database 304 further comprises a fourth table 510 similarly mapping store domains into account IDs directly, without the need for any parameters. Login router 304 further comprises a fifth table 512 mapping third party partner IDs, based a PACCT ID of an account registered with that third party partner, into account IDs, this table being invoked in the context of server-to-server XML exchanges. It is to be appreciated that the login router database structure of FIG. 5 is presented by way of example and not by way of limitation. In view of the present disclosure, one skilled in the art would readily be able to develop tables in a login router database necessary for properly associating an incoming HTTP request with an appropriate application server version, the login router database being highly dependent on the particular features and capabilities of the web-based business information system.

In the preferred embodiment of FIGS. 3 and 5, the login router database 304 is installed on a server separate from the common set of web servers and accessed across a network. It is more preferable, however, to copy smaller and/or less-frequently changing portions of the login router database 304 to each of the web servers 202 for expediting the lookup process. Examples of such smaller and/or more static lookup tables are the store alias lookup table 508 and the store domain lookup table 510. In conjunction therewith, it is also preferable to invoke a caching scheme between the login router database 304 and each web server 202 to further expedite the lookup process.

Advantageously, in any of a variety of circumstances in which external third parties have been using a particular URL and parameter set to interact in a particular way with an account in the web-based business information system, that URL and parameter set does not need to be changed when that account is upgraded to the new version of the web-based business information system. Thus, for example, if an end user of Alpha Enterprises had sent out flyers with a link to their online lead form (e.g., [website URL preflx]/app/crm/sales/onlineleadform.ns?ACCOUNTID=ACCT_A) several months prior to their version upgrade, that link is still good after Alpha Enterprises is upgraded to the new version of the web-based business information system. The practical importance of this advantage is especially evident in the case of third party server-to-server XML exchanges. For example, an account such as Carl's Camera may separately subscribe to VisaPay for receiving payments, having a VisaPay account of U8P. Months prior to the upgrade of Carl's Camera to the new version of the web-based business information system, Visa-Pay may have been configured for a server-to-server XML exchange with the web-based business information system to post payments into the accounting data when a transaction has been completed (e.g., [website URL prefix]/s/smbXML?PARTNERID=VISAPAY&PACCT=U8P& . . . ), and this does not need to be changed after the upgrade, even though the account data for Carl's Camera may be stored according to an entirely new database schema.

Figure 6:
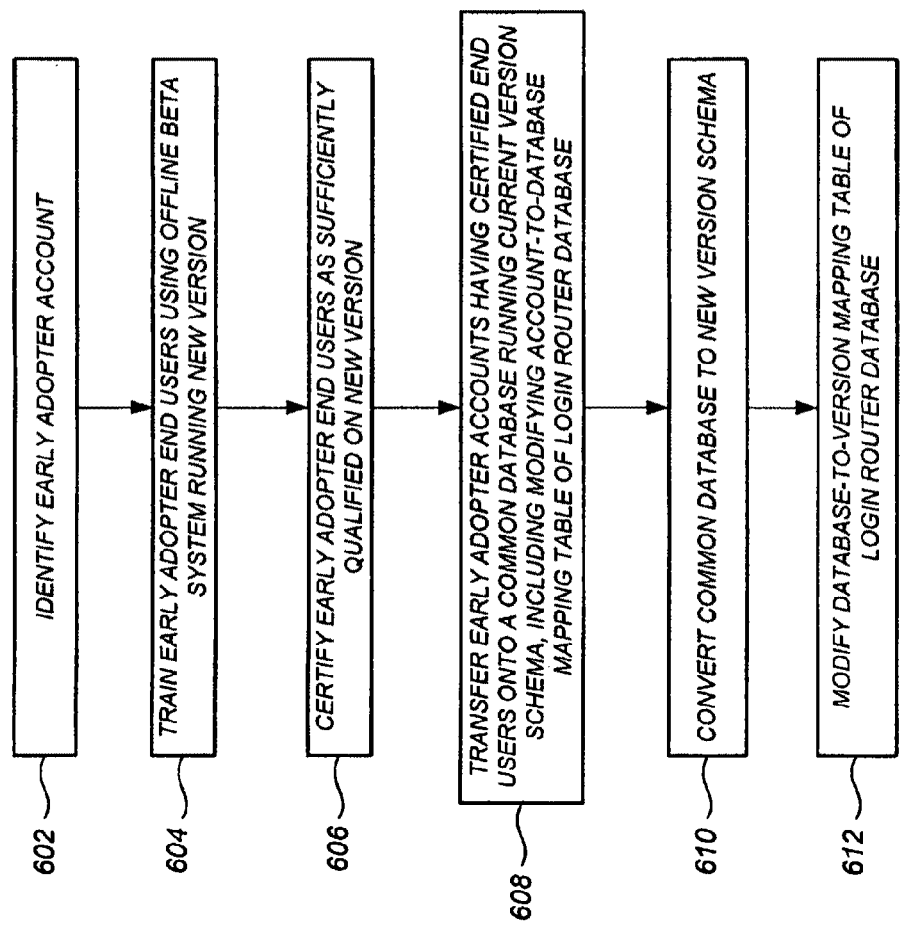
FIG. 6 illustrates an early adopter identification and upgrading process according to a preferred embodiment.

FIG. 6 illustrates an early adopter identification and upgrading process according to a preferred embodiment. During, a phased rollout period, early adopter accounts are identified from the base of current version accounts (step 602), and early adopter end users are trained by agents of the web-based business information system provider using an offline beta system running the new version (step 604). In one preferred embodiment, the early adopters comprise advanced users who have previously requested one or more new features that are in the new version, who have posed challenging advanced questions to support personnel, and/or who have otherwise expressed interest in upgrading earlier rather than later. An early adopter account is switched over to the new version only upon certification (step 606) by the agents of the web-based business information system provider that their end users are sufficiently qualified. Advantageously, because they are working on live data with real consequences, the early adopters can often identify bugs in the new version not previously identified during beta testing, which can then be corrected before subsequent accounts are switched over. Preferably, the account data for a common set of early adopters is migrated to a common current-version database (step 608), and that common set of early adopters are all switched over at the same time in by converting (step 610) the common database to the new version and updating the login router database (step 612) of the web-based business information system accordingly.

Figure 7:
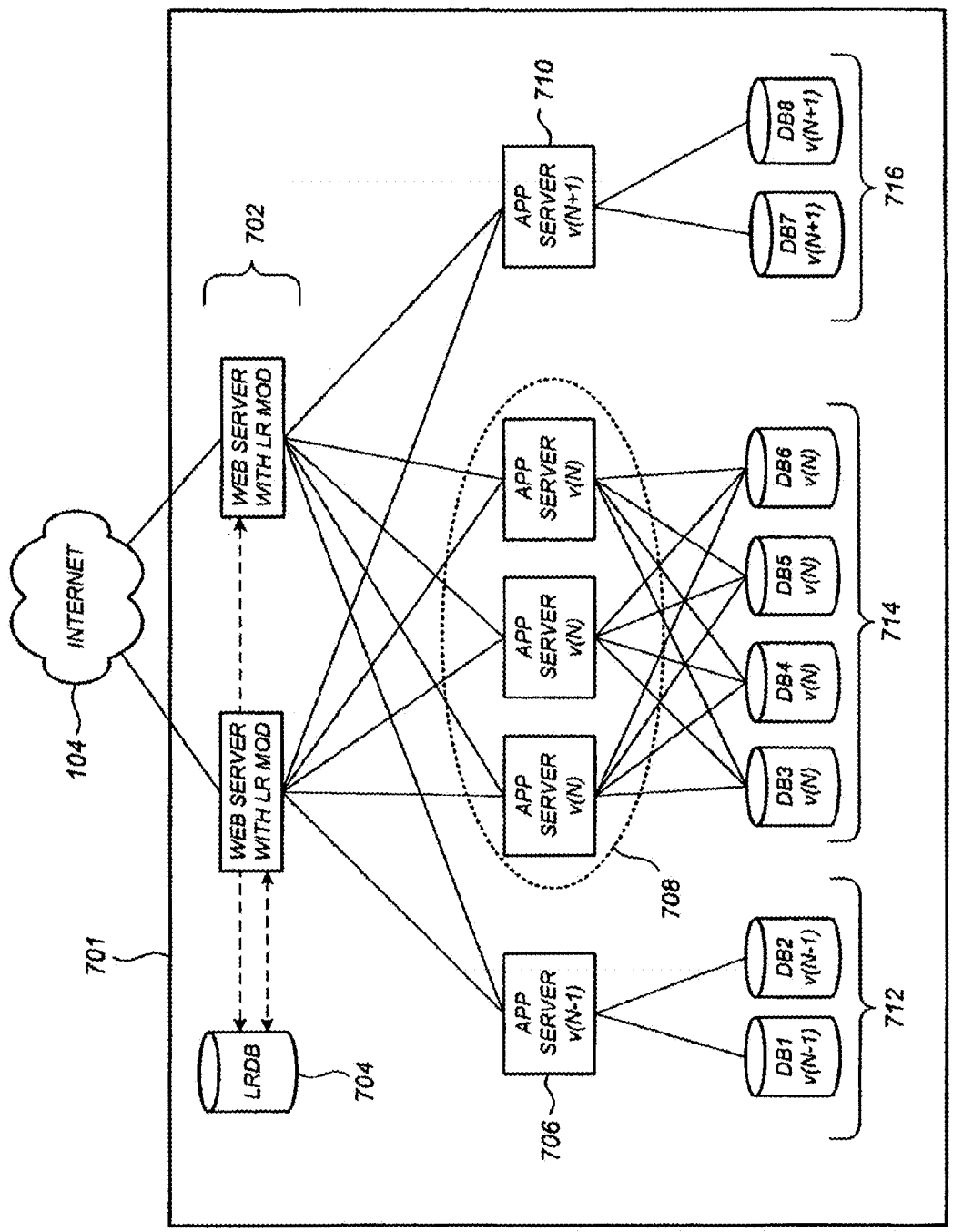
FIG. 7 illustrates a web-based business information system according to a preferred embodiment.

FIG. 7 illustrates a web-based business information system 701 in accordance with another preferred embodiment in which there are three system versions being serviced simultaneously (version "N−1", "N", and "N+1"), respectively. A common set of web servers 702 routes requests among three sets of application servers 706, 708, and 710 based on the contents of a login router database 704. Each set of application servers 706, 708, and 710 are associated with a distinct server group 712, 714, and 716, respectively. The system of FIG. 7 may be used, for example, when there is a particular group of "slowpokes" stuck on version "N−1", a group of conventional users on the current version "N", and a group of advanced users who are using version "N+1". Advantageously, the two-version login router database 3 can be readily modified into a three-version login router database simply by modifying the contents of the table 504 that maps databases into version identifiers. Accordingly, the preferred embodiments are readily extended to include "M" different versions of the system, in which case M sets of application servers are provided, M sets of databases are provided, and M possible conclusions are derived from the login router database.

Figure 8:
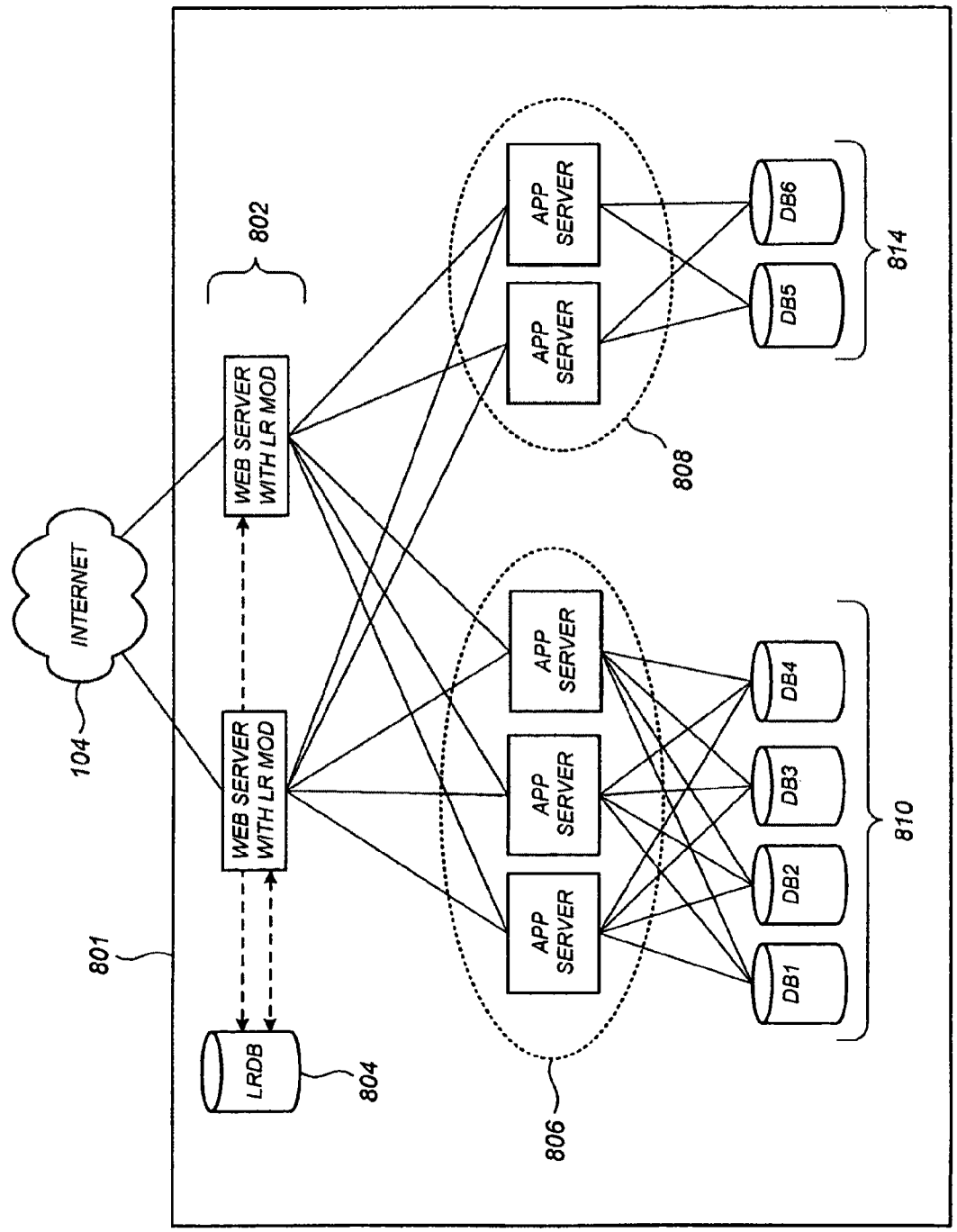
FIG. 8 illustrates a web-based business information system according to a preferred embodiment.

FIG. 8 illustrates a web-based business information system 801 according to a preferred embodiment, in which a login router database 804 is used to route requests based on a class of service rather than a system version by web servers 802. Thus, for example, the bulk of "common" system subscribers would be associated with the set 806 of application servers and set 810 of databases, while a set of "preferred" customers would be associated with a set 808 of application servers and set 814 of databases dedicated only to "preferred" customers. A subscribing customer would, for example, pay extra fees on a monthly basis to keep their status as a preferred customer, or particular "important" accounts can stay on preferred status for no extra charge.

In another preferred embodiment (not shown), where the database schema are identical and the customers are only differentiated by class of service, the databases 810 and 814 can actually be replaced by a common database set that is in communication with all of the application servers. In this case, the login router database would be configured to map client requests into Account ID's, and then to map Account ID's into application server sets, without regard to database assignment. As would be readily understood by one skilled in the art, the preferred methods and systems are readily used to provide any of a variety of combinations of the foregoing capabilities, such as in a system that accommodates different versions as well as different classes of service within each version.

A web-based business information system according to one or more of the preferred embodiments provides advantages where other alternatives may have deficiencies. For example, routing incoming client requests based either a database access by the application server or a "left/right" decision by a user, followed by a 302 redirect, may falter in the case of server-to-server information exchanges or with POST requests. Moreover, such approaches often implicate the construction of two complete virtual web infrastructures, and the associated hardware, software, and maintenance costs.

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, it is to be appreciated that while the examples supra are presented for a multi-functional web-based business information system (i.e., offering multiple services such as web store, ERP, CRM, etc.), the scope of the preferred embodiments is not so limited. Rather, the preferred embodiments are equally applicable to web-based business information systems having only a single functionality, such as a web-based CRM system, a web-based accounting system, and so on, as well as to web-based business information systems providing combinations of two or more of these functionalities.

By way of still further example, it is to be appreciated that there may be intermediate servers located between the common web servers and the application servers, and/or preliminary web servers placed out front of the common web servers relative to the Internet, without necessarily departing from the scope of the preferred embodiments. For example, there may be some preliminary routing, based on other criteria generally unrelated to version upgrade routing, as in the case where a first server farm in Canada is used only to host web stores and therefore to process shopping only, while another server farm in California is used to process only CRM requests, while still another server farm in Ohio is used to process the rest of the account data. In such case, there may be a preliminary web server that routes requests to the different server farms based solely on that web store/CRM/other routing criteria, and then there would be separate groups of common web servers supra placed out in front of each of the different server farms. Alternatively, in another preferred embodiment the web store/CRM/other routing can be performed behind the common web servers supra and in front of separate groups of commonly versioned application servers.

By way of even further example, although described in terms of the use of a login router database to facilitate URL-agnostic version differentiation or class-of-service differentiation, the preferred embodiments are readily extended to include routing based on a variety of different criteria, such as for resource balancing by company (Account ID) or by function (ERP, CRP, etc.) By way of still further example, the term URL as used supra can also, as is common in the art, be construed as referring to the broader class of URIs (Uniform or Universal Resource Identifiers) of which it is a particular type. By way of still further example, the web servers supra can be used to generate HTTP responses on behalf of the application servers, and to extract information from client requests and use a protocol other than HTTP to pass that information to the application servers, without departing from the scope of the preferred embodiments. In an embodiment according to a three-tiered architecture, this can be achieved while still keeping the bulk of the heavy lifting tasks at the application server level. Thus, reference to the details of the preferred embodiments are not intended to limit their scope, which is limited only by the scope of the claims set forth below.

Although the web-based business information system described herein may be implemented in the form of a set of servers and associated applications that are either located in a single facility or are split into multiple facilities based on function, the business information system may also be implemented as multiple independent systems housed in geographically dispersed data centers. In this embodiment, a substantially complete business information system (which may also be referred to as a multi-tenant business data processing platform) may be housed in each of a plurality of data centers, and requests for data and/or services would be routed to the appropriate data center for processing.

Such a multi-data center architecture may benefit from the advantages of having replicated functionality located in different data centers. For example, by setting up a plurality of substantially autonomous data centers, a business operating the data centers can improve its ability to recover from a serious network or hardware problem (disaster recovery), improve performance by reducing the load on a single central platform, enable servicing customers based on their geographic location, and provide better operational support and logistics (network connectivity, hardware maintenance, power regulation, costs, etc.). Since the use of multiple data centers provides these benefits, this type of architecture is becoming increasingly desirable. As recognized by the inventors, the functionality provided by an embodiment of the invention can be extended and enabled to operate in this type of system architecture.

Given a plurality of geographically dispersed data centers, an embodiment of the invention may be implemented by including the following modifications:

1. Identification of each Data Center via a unique identifier, which is then associated with a customer. This parallels, and augments, the concept of an application or platform version identifier described herein with reference to other embodiments;
2. In addition to identification of application version, the embodiment identifies the appropriate Data Center Id utilizing the context upon which existing functionality was based. In this regard, the context utilized for identification should be considered "opaque", but should be applied consistently (where "opaque" indicates that the underlying protocol (e.g., HTTP, ODBC, etc.) may have different semantics, but that the routing implementation provides a consistent interface for accessing the necessary context data);
3. The Data Center identifier is used to route the service request to the appropriate Data Center, and ultimately to the appropriate version of an application, where the request is processed and responded to by the platform. Note that in one embodiment, the Data Center identifier may only identify the appropriate Data Center; once routed to the correct Data Center, the Application Version identifier may be used to identify the appropriate application version/release within that Data Center (thus, in one embodiment, the identification of the application version may occur once the correct Data Center has been identified and the service request has been routed to that Data Center); and
4. Where necessary, modification of addresses, headers, etc. to enable proper routing of service request to correct Data Center, and routing of response to user requesting service.

Thus, as recognized by the inventors, in an embodiment of the invention that is implemented as part of an architecture that includes multiple, substantially autonomous data centers, the single data center implementation may be leveraged and modified, since it provides a centralized implementation in which context lookups are supported. Therefore, by augmenting that embodiment to enable lookup of an additional modifier (e.g., a Data Center identifier), a beneficial extension of the single data center embodiments may be obtained.

As noted, the previously described embodiments of the inventive phased rollout or upgrade system and methods are capable of being implemented in a manner that performs context discovery with regards to a known address a URL) for purposes of routing a service request to a correct version of an application. As recognized by the inventors, this Business Data Processing Application version lookup process can be modified to include a Data Center context, which can then be used by the Platform if routing to the appropriate Data Center is needed. For example, in one embodiment:

1. Separate sub domains may be used for each data center—
   a) One data center may retain the present domains;
   b) Additional data centers may be assigned appropriate sub-domains (e.g., .na1);
   c) Given this sub-domain type, an example of a system domain mapping might be
      i. Original domain—system.business.com
      ii. Sub-domain—system.na1.business.com;
   d) A platform routing application being executed may be modified to be able to lookup the associated domain by data center;
2. The application will operate to route a request to the correct Data Center should it be received and processed by an incorrect data center; and
3. The platform routing application will be modified to use context (Data Center) aware lookups for domain redirects. (e.g., you cannot blanket redirect to system.business.com).

In one embodiment, a redirect process is utilized to direct the user service request to the correct Data Center (via reference to the correct domain). In the case where a redirect function is not applicable to the service, an alternate solution may be available. For example, in the case of some "Web Services", there is no "browser" involved in the transaction so it cannot be assumed that a redirect will be supported (although it may be supported). In this situation, a user facing "discovery" service may be provided by which a user can perform a lookup of the correct Data Center domain to which the operation should be directed. In cases where a HTTP protocol is used, if the originating request is of type "GET", then the invention may use an unconditional redirect to the appropriate Data Center domain. One embodiment of the invention utilizes a "Data Center Router". This is a service that leverages injected context, collects/processes required data into the appropriate format, and redirects a user to the correct Data Center (i.e., the domain corresponding to the appropriate one for that user and/or service request).

In general terms, in one embodiment of a data center based implementation of the inventive phased rollout or upgrade service:

1. A HTTP POST request can be duplicated via a client HTTP library; and
2. HTTP Response headers via a pass through can accurately and completely be transferred in response to au original HTTP request.

In one example, an embodiment of the inventive process can be implemented by the following method, steps, operations, or functions:

1. The correct Data Center domain is discovered and used to create the base of a pass through URL. The context for discovery is provided via augmentation of the previously described Phased Rollout/Upgrade methodology;
2. The pass through URL will be the same as the original with the exception that the domain name will be replaced;
3. Using a HTTP library, pass through the original request to the correct data center;
4. Upon response, transfer HTTP response headers to the originating HTTP Response; and
5. issue a redirect to the correct domain.

Figure 9:
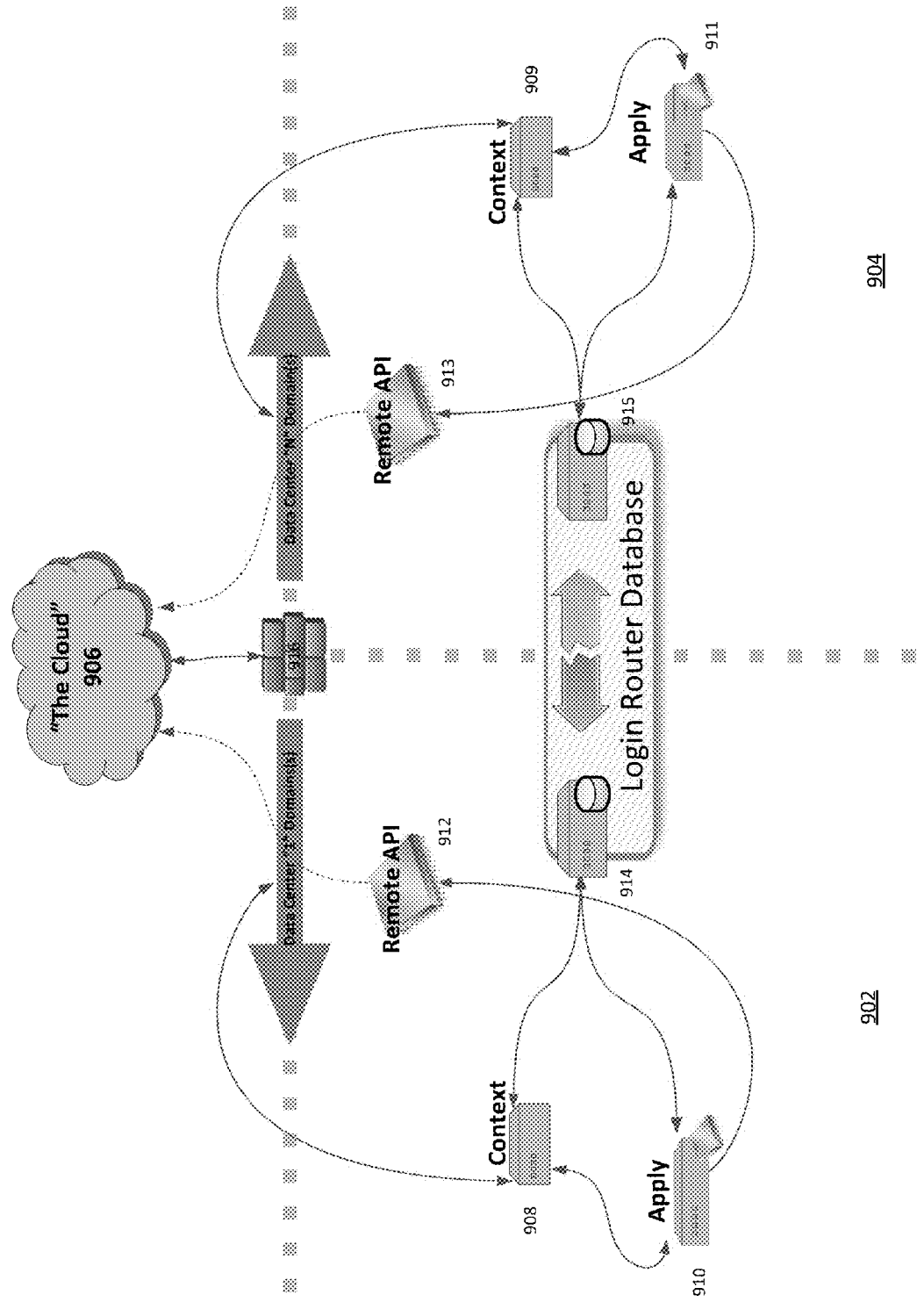
FIG. 9 is a diagram illustrating certain functional elements of an architecture in which an embodiment of a data center based implementation of the inventive phased rollout or upgrade service may be implemented.

FIG. 9 is a diagram illustrating certain functional elements of an architecture 900 in which an embodiment of a data center based implementation of the inventive phased rollout or upgrade service may be implemented. As shown in the figure, a business may be operating a multi-tenant business data processing platform using more than a single data center. In the example shown in FIG. 9, the plurality of Data Centers is illustrated as Data Center "1" Domains 902, and Data Center "N" Domains 904, although it is understood that additional, un-depicted Data Centers may be part of the architecture.

Each Data Center is associated with a Context process (element 908 of Domains 902, and element 909 of Domains 904), which may be implemented by a suitably programmed computing device or apparatus (e.g., a Server). The Context process processes a received message to determine the appropriate Data Center for servicing the request/message and the appropriate Application version. The Context process may use any suitable or relevant information or data in making these determinations, including but not limited to, HTTP URL, message parameters, message headers, message payload, message origination address (which may indicate the domain of the sender, and hence the sender identity), etc. In one embodiment, the Context Process may modify or add data to the message to reflect the appropriate Data Center for servicing the message.

Each Data Center is also associated with an Apply Process (element 910 of Domains 902, and element 911 of Domains 904), which may be implemented by a suitably programmed computing device or apparatus (e.g., a Server). The Apply process operates as a check or verification on the data modified or added by the Context Process. For example, if the Data Center identifier and/or Application version (or other information in the service request/message) is not compatible with the Data Center capabilities of the Data Center in which the message is being processed, then this process may be used to route the service request/message to the correct Data Center (via Remote API 912 for example, which permits transfer of data and information via the Internet, depicted as "The Cloud" 906 in the figure, which may be separated from one or more domains by a firewall 916). This routing or re-routing may be accomplished by changing the domain name for the destination URL of the message, for example. Note that Data Center N Domains 904 include a similar Apply process and Remote API (element 913).

As mentioned, the Remote API (elements 912 and 913) functions to permit transfer of data and information (typically in the form of a message) between Data Centers, typically via a connection to the Internet (depicted as "The Cloud" 906 in the figure). Remote API 912 and 913 provide a service that enables communication with a destination Data Center, and may be used to perform one or more desired functions. For example, if a user is logging into the system, but posted their credentials to the incorrect Data Center, then:

1. The request is completed on their behalf via the Remote API;
2. An identifier is returned via Remote API which allows the user to 'join' the operation in the correct Data Center;

3. The user is redirected to the correct Data Center with a returned identifier (hashed) which is then verified and joined; and
4. Subsequent operations occur in the correct Data Center and no further routing is needed.

Each domain or set of domains (e.g., elements 902 and 904 in the figure) also include a Login Router Database (depicted as elements 914 and 915 in the figure), which function in a similar manner to the Login Router Database described herein with reference to single data center embodiments of the invention. In one embodiment, Login Router Database 914 (and similarly, the respective Login Router Database in other Data Center Domains) store data that is utilized or added via the Context Processes operating in each Data Center Domain (or Domains) so that such data is synchronized/replicated across each Data Center in the system. Thus, each Data Center maintains a directory, database, or file of information needed to route an incoming service request/message to the appropriate Data Center for servicing the message. For example, Login Router Database 914 may store information and/or data used by Context Process 908 to enable a received service request/message to be routed to the correct Data Center (such as a look up table or database containing an association between a user/tenant and the appropriate Data Center or domain for servicing a request from that user, etc.). Note that in one embodiment, the data/information stored in the database includes identification of an application version for the customer and the appropriate Data Center (i.e., a mapping of customer to application version and Data Center) and may not include other routing or contextual information. For example, in such an embodiment, transaction (request) specific context data may not be stored in the database for use between Data Center routing. In this example, some or all the context data exists for the lifetime of the transaction (request) being processed and is bound to that transaction (request).

When a request for service from a user (such as a tenant of the multi-tenant platform) is received, there are two typical workflows, depending upon whether the request was received at the correct Data Center (Workflow 1, where no routing or re-directing is needed) or was received at an incorrect Data Center (Workflow 2).

For example, in Workflow 1:
1. The Context process is applied and correct;
2. The Apply process is not used, nor is the Remote API; and
3. Users thus operate within the domain (Data Center) at which the original request arrived.

In contrast, in Workflow 2:
1. The Context process is applied and is incorrect;
2. The Apply process detects the incorrect Context data and utilizes the Remote API to interact with the correct Data Center; and
3. A redirect is used to send the user request to the correct Data Center at which Workflow 1 is applied.

Figure 10:
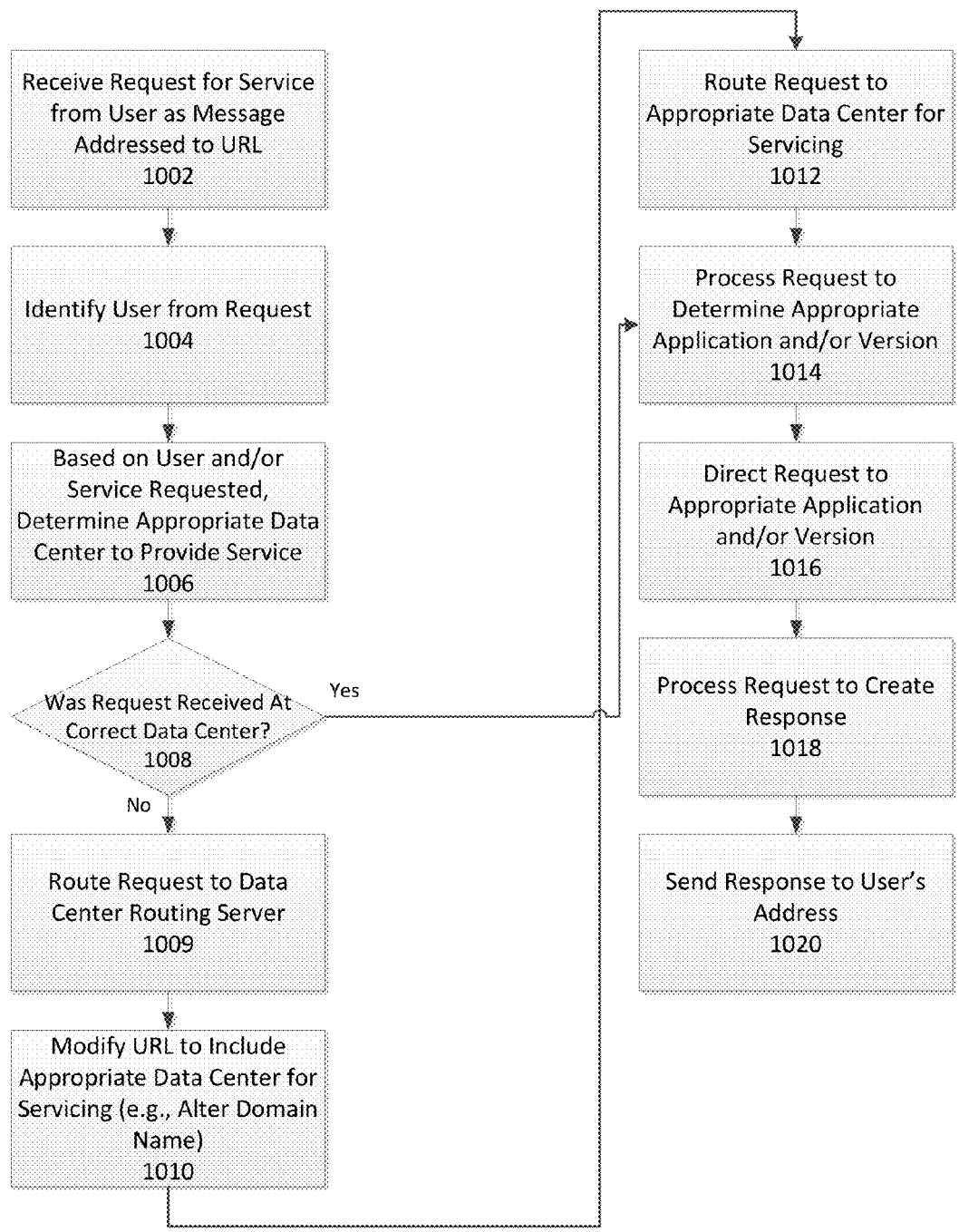
FIG. 10 is a flowchart or flow diagram illustrating the steps or stages of a process, function, method, or operation for servicing a request from a user of a multi-tenant business data processing platform by routing the request to an appropriate Data Center and business application version, and which may be implemented in accordance with an embodiment of the inventive system and methods.

FIG. 10 is a flowchart or flow diagram illustrating the steps or stages of a process, function, method, or operation 1000 for servicing a request from a user of a multi-tenant business data processing platform by routing the request to an appropriate Data Center and business application version, and which may be implemented in accordance with an embodiment of the inventive system and methods. As shown in the figure, at step or stage 1002, a request for service is received from a user. The user is typically a tenant of the multi-tenant business data processing platform or system. The request is typically a message that is addressed to a specific URL. The URL will include a domain name, which may be a general one corresponding to an entry point for receiving services from the platform (e.g., a Service Request Server) or other element that performs a similar function.

The received request is then processed to identify the sender, i.e., the user of the platform or system (step 1004). Typically, this may be determined from a header of the message or the domain of the "from" address of the sender (which would identify the tenant of the system or platform). Based on one or more of the user identity and the service requested, a database access or other form of data lookup may be performed (e.g., accessing a lookup table, user preference file, etc.) to determine the appropriate Data Center to which the request should be routed (step 1006). Although this determination may be based solely on the identity of the user/tenant, note that it may also be dependent on one or more other factors, including but not limited to, the type of service or application referenced in the request, the location of the user/tenant, the current load on the network of Data Centers, the expected time to service the request, etc.

Once the appropriate Data Center for servicing the request is identified, it is determined if the Data Center at which the request was received is the correct one (step 1008). If the request was received at the correct Data Center (corresponding to the "Yes" branch of step 1008), then control is passed to step 1014 where the request is processed to determine the appropriate application and/or version for responding to the request.

However, if the request was not received at the correct Data Center (corresponding to the "No" branch of step 1008), then the request may be routed to a Data Center Routing Server (step 1009) which functions to alter the destination URL for the service request/message so that it includes a reference to the correct Data Center (step 1010). This may be done by any suitable method, such as by altering the domain name for the destination to include an identifier for the Data Center. For example, if the Data Center is located in California, then the domain name may be modified to include reference to that Data Center, such as by appending ".ca" to the domain name (note that this is simply an example of a possible domain name modification, as is the use of the domain names "system.business.com" and "system.na1.business.com" mentioned previously). In addition to an identifier for the Data Center, the Data Center Routing Server or other element may also modify a message header or payload to include special processing instructions for the request. Such special instructions may be based on the contents of the original request, the identity of the user/tenant, the particular Data Center, etc.

After modification of the destination URL, the message is then re-directed to the appropriate Data Center for servicing (step 1012). The service request/message is received at the appropriate Data Center and processed to determine the appropriate business application and/or version to which the user/tenant is entitled (step 1014). This determination may be performed in accordance with one or more of the processes or methods described herein with reference to the operation of the Login Router Server. As described, a Login Router Server (or other data processing device) may process the service request to identify the user/tenant, and based on that information determine the appropriate business application or business application version to which the user is entitled. After determining the appropriate business application or business application version, the service request/message is routed to a server or computing device that is executing that application/version (step 1016).

The appropriate business application or business application version then receives the service request and processes it to produce a response for the user (step 1018). As described herein, the response may include raw business data, processed data, a report, etc. The response is then sent to the user's/tenant's address (step 1020).

As described, in one embodiment of the invention, a service request/message may be routed to an appropriate Data Center for further processing, thereby enabling the inventive phased rollout/upgrade capabilities to be implemented within an architecture that includes a plurality of substantially independent Data Centers. This permits use of the inventive phased rollout/upgrade capabilities within an architecture that provides other benefits to an operator of the multi-tenant business data processing system/platform. Such benefits may include one or more of:

1. The Data Centers are largely, if not completely, autonomous. A failure or outage in one Data Center will not impact the operations of another;
2. Minimal replication of data between Data Centers is required since each serves a different and (typically, or preferably) non-overlapping set of users/tenants. For example, in one embodiment, a specific user/tenant stores data in, and is serviced by, a single Data Center;
3. Minimal cross Data Center communication is required, which provides cost, performance and operational benefits;
4. This embodiment requires no knowledge by a user as to which Data Center houses their data. They are transparently redirected to the correct Data Center should they utilize a domain bound to one other than where their data resides; and
5. This architecture allows customers to be moved to another Data Center (e.g., disaster recovery and performance) should the need arise and without a user being impacted.

This description discusses illustrative embodiments of the inventive system and methods for providing a phased rollout/upgrade capability to a multi-tenant data processing system/platform. It is presented with reference to the accompanying drawings in order to provide a person having ordinary skill in the relevant art with a full, clear, and concise description of the subject matter defined by the claims which follow, and to enable such a person to appreciate and understand how to make and use the invention. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee(s) claim exclusive entitlement.

The subject matter of one or more embodiments of the invention is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying or requiring any particular order or arrangement among or between various steps or elements except when the order of individual steps or arrangement of elements is explicitly required. Embodiments differing from those described and shown herein, but still within the scope of the defined methods and systems are envisioned by the inventors and will be apparent to persons having ordinary skill in the relevant art in view of this specification as a whole. The inventors intend for the defined methods and systems to be practiced other than as explicitly described herein. Accordingly, the defined methods and systems encompass all modifications and equivalents of the subject matter as permitted by applicable law.

Among other embodiments, the invention may be embodied in whole or in part as a system, as one or more processes, operations, methods, or functions, or as one or more apparatuses or devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is programmed with a set of executable instructions (e.g., software instructions), where the instructions may be stored in a suitable data storage element. The processor, microprocessor, CPU or controller may be a component or element of a computing device or data processing device or platform, such as a server and an associated data storage or database. In some embodiments, one or more of the operations, functions, processes, or methods described herein may be implemented by a specialized form of hardware, such as a programmable gate array, application specific integrated circuit (ASIC), or the like. The detailed description provided herein is, therefore, not to be taken in a limiting sense.

It should be understood that the present invention as described herein can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++, or Perl, using, for example, conventional or object-oriented techniques. The software code may be stored as a series of instructions, or commands on a computer readable medium, such as a random access memory (RAM) a read-only memory (ROM), a magnetic medium such as a hard-drive, a solid-state device such as a flash memory drive, or an optical medium such as a CD-ROM. Any such computer readable medium may reside on or within a single computational apparatus, and may be present on or within different computational apparatuses within a system or network.

What is claimed is:

1. A method for processing a client request in a web-based business information system, the web-based business information system being in a state of phased rollout from a current version to a newer version, the web-based business information system maintaining both upgraded and non-upgraded client accounts during the phased rollout, wherein the method comprises receiving a client request at a server;
processing the client request to determine an identity of the client;
based on the identity of the client, determining a correct data center for servicing the request;
determining if the request was received at the correct data center for servicing the request;
if the request was not received at the correct data center, then modifying a destination address of the request to include an identifier for the correct data center;

processing the request at the correct data center to determine an application version for servicing the request, wherein determining an application version for servicing the request includes determining whether the client request is associated with a non-upgraded account or an upgraded account;

sending the client request to one of a first set of application servers at the correct data center if the client request is associated with a non-upgraded account, the first set of application servers configured to process client requests according to the current version of the web-based business information system; and sending the client request to one of a second set of application servers at the correct data center if the client request is associated with an upgraded account, the second set of application servers configured to process client requests according to the newer version of the web-based business information system.

2. The method of claim 1, further comprising, sending the client request to one of the first or second sets of application servers based on a cookie or cookie-like data item accompanying the client request if processing the received request at the correct data center to determine an application version for servicing the request is not successful.

3. The method of claim 1, wherein processing the client request to determine an identity of the client further comprises comparing one or more parameters accompanying the client request to information contained in a database.

4. The method of claim 1, wherein processing the received request at the correct data center to determine an application version for servicing the request-further comprises processing the request to determine whether the client is associated with an upgraded or a non-upgraded account.

5. The method of claim 1, wherein the web-based business information system further comprises a plurality of databases, with each client account having its business data stored in a single one of the databases, the plurality of databases including a first database set associated with the first set of application servers, and including a second database set associated with the second set of application servers.

6. The method of claim 1, further comprising:
processing the request to create a response; and
providing the response to the client.

7. The method of claim 1, wherein modifying a destination address of the request to include an identifier for the correct data center further comprises modifying a URL to include the identifier for the correct data center.

8. A computer-implemented method of maintaining a plurality of versions of a web-based business information system, comprising:
identifying a set of subscriber accounts to be migrated from a first of the plurality of versions to a second of the plurality of versions, the first of the plurality of versions associated with a first database schema distinct from a second database schema associated with the second of the plurality of versions;
migrating data associated with the set of subscriber accounts from the first database schema to the second database schema, the first database schema maintained by a first set of database servers distinct from a second set of database servers maintaining the second database schema;
receiving a client request associated with a uniform resource locator and a set of parameters;
processing the client request to determine an identity of the client;
based on the identity of the client, determining a correct data center for servicing the request;
determining if the request was received at the correct data center for servicing the request;
if the request was not received at the correct data center, then modifying a destination address of the request to include an identifier for the correct data center;
processing the client request at the correct data center to determine an application version for servicing the request;
determining that the client request is associated with at least one of the set of migrated subscriber accounts by comparing one or more of the uniform resource locator and the set of parameters associated with the client request to information contained in a database; and
forwarding the client request to a set of application servers configured at least to process the client request in accordance with the second database schema.

9. The computer-implemented method of claim 8, wherein the client request specifies at least a portion of the uniform resource locator and the set of parameters.

10. The computer-implemented method of claim 8, wherein the set of parameters does not include a password.

11. The computer-implemented method of claim 8, wherein modifying a destination address of the request to include an identifier for the correct data center further comprises modifying a URL to include the identifier for the correct data center.

12. The computer-implemented method of claim 8, further comprising:
processing the request to create a response; and
providing the response to the client.

13. The computer-implemented method of claim 8, wherein the set of application servers configured at least to process the client request in accordance with the second database schema are configured to execute a set of business applications that include one or more of an [ERP] enterprise resource planning application and a [CRM] customer relationship management application.

14. A system for maintaining a plurality of versions of a web-based business information system, comprising:
a first data center with an associated set of application servers configured to execute a set of business applications;
a second data center with an associated set of application servers configured to execute a set of business applications;
a first server located in the first data center, the first server configured to receive a request from a client and to execute a process to:
process the request to determine an identity of the client;
based on the identity of the client, determine a correct data center for servicing the request;
determine if the request was received at the correct data center for servicing the request; and
if the request was not received at the correct data center, then modify a destination address of the request to include an identifier for the correct data center; and
a first database located in the first data center, the first database including data associating the client with the correct data center for servicing a request from the client.

15. The system of claim 14, further comprising:
a second server located in the second data center, the second server configured to receive a request from a client and to execute a process to:
process the request to determine an identity of the client;

based on the identity of the client, determine a correct data center for servicing the request;
determine if the request was received at the correct data center for servicing the request; and
if the request was not received at the correct data center, then modify a destination address of the request to include an identifier for the correct data center; and
a second database located in the second data center, the second database including data associating the client with the correct data center for servicing a request from the client.

16. The system of claim 15, wherein the first server located in the first data center and the second server located in the second data center that are configured to receive a request from a client and if the request was not received at the correct data center, then to execute a process to modify a destination address of the request to include an identifier for the correct data center, are further configured to modify a URL to include the identifier for the correct data center.

17. The system of claim 14, wherein the set of application servers associated with the first data center are configured to execute a set of business applications that include one or more of an [ERP] enterprise resource planning application and a [CRM] customer relationship management application.

18. The system of claim 14, wherein the set of application servers associated with the second data center are configured to execute a set of business applications that include one or more of an [ERP] enterprise resource planning application and a [CRM] customer relationship management application.

19. The system of claim 14, wherein the set of application servers associated with the first data center are configured to execute a first and a second version of one of the set of business applications, and further, wherein the first data center includes a server configured to:
process the request to determine an application version for servicing the request; and
based on the determined application version for servicing the request, route the request to either a server in the first data center executing the first version of the application or to a server in the first data center executing a second version of the application.

20. The system of claim 19, wherein the server in the first data center executing the first version of the application or the server in the first data center executing a second version of the application is further configured to:
process the request to create a response; and
provide the response to the client.

21. The system of claim 14, wherein the first server located in the first data center [and the second server located in the second data center that are] that is configured to receive a request from a client and if the request was not received at the correct data center, then to execute a process to modify a destination address of the request to include an identifier for the correct data center, [are] is further configured to modify a URL to include the identifier for the correct data center.

* * * * *

UNITED STATES PATENT AND TRADEMARK OFFICE
CERTIFICATE OF CORRECTION

PATENT NO. : 9,009,313 B2
APPLICATION NO. : 13/914019
DATED : April 14, 2015
INVENTOR(S) : Theodore R. Rice, Steven Ellis Rolls and Christian Marenbach Page 1 of 1

It is certified that error appears in the above-identified patent and that said Letters Patent is hereby corrected as shown below:

In the Claims

Column 24, Line 37, delete "[ERP]"

Column 24, Line 38, delete "[CRM]"

Column 25, Line 23, delete "[ERP]"

Column 25, Line 24, delete "[CRM]"

Column 25, Line 28, delete "[ERP]"

Column 25, Line 29, delete "[CRM]"

Column 26, Lines 21-22, delete "[and the second server located in the second data center that are]"

Column 26, Line 26, delete "[are]"

Signed and Sealed this
Eighteenth Day of August, 2015

Michelle K. Lee
*Director of the United States Patent and Trademark Office*